US007934993B2

(12) United States Patent
Kuehling et al.

(10) Patent No.: US 7,934,993 B2
(45) Date of Patent: May 3, 2011

(54) SECURE PROGRESSIVE CONTROLLER

(75) Inventors: Brian L. Kuehling, Henderson, NV (US); Michael F. Hollenbeck, North Las Vegas, NV (US); Clyde Ruckle, Las Vegas, NV (US)

(73) Assignee: IGT, Reno, NV (US)

(*) Notice: Subject to any disclaimer, the term of this patent is extended or adjusted under 35 U.S.C. 154(b) by 2 days.

(21) Appl. No.: 11/698,767

(22) Filed: Jan. 25, 2007

(65) Prior Publication Data

US 2008/0090653 A1 Apr. 17, 2008

Related U.S. Application Data

(63) Continuation-in-part of application No. 11/582,134, filed on Oct. 16, 2006.

(51) Int. Cl.
*A63F 9/24* (2006.01)
*A63F 13/00* (2006.01)

(52) U.S. Cl. ................. 463/29; 463/24; 463/40; 463/42

(58) Field of Classification Search .................... 463/25, 463/29, 39–43

See application file for complete search history.

(56) References Cited

U.S. PATENT DOCUMENTS 4,283,709 A * 8/1981 Lucero et al. ................... 463/25
4,357,605 A * 11/1982 Clements ................... 340/825.2
4,636,951 A * 1/1987 Harlick ........................... 463/25
5,116,055 A 5/1992 Tracy
5,146,273 A 9/1992 Yamada
5,237,677 A * 8/1993 Hirosawa et al. ............... 714/57
5,257,179 A * 10/1993 DeMar ............................ 463/25
5,257,981 A 11/1993 Takahashi
5,280,909 A 1/1994 Tracy
5,344,144 A 9/1994 Canon
5,467,856 A * 11/1995 Okada ........................... 194/202
5,496,032 A * 3/1996 Okada ............................. 463/25
5,536,016 A 7/1996 Thompson
5,611,730 A * 3/1997 Weiss .............................. 463/20
5,630,755 A * 5/1997 Walsh et al. .................... 700/91

(Continued)

FOREIGN PATENT DOCUMENTS

AU 589158 2/1986

(Continued)

OTHER PUBLICATIONS

"XML Tutorial", by Shermin Voshmgir dated 1999, from http://www.jayacommerce.com/displaypage.jsp?name=intro.sql&id=18238.*

(Continued)

*Primary Examiner* — Melba Bumgarner
*Assistant Examiner* — Steven J. Hylinski
(74) *Attorney, Agent, or Firm* — Armstrong Teasdale LLP

(57) ABSTRACT

A method and system for configuring a progressive system that insures enhanced operative control and security of the progressive system. The progressive controller provides one or more electronic security keys to access and verify modifications to the progressive configuration. The allocated number of gaming devices connected to the progressive system is authenticated by a dedicated electronic security key. Gaming devices in excess of the allocation are disabled from the progressive system. The electronic security keys are configured with an expiration parameter that requires gaming establishments to remain current with respect to progressive system agreements. The data on the progressive controller is established so it may be read by browser interface software. Progressive system configuration parameters are automatically acquired and authenticated by the progressive controller.

29 Claims, 15 Drawing Sheets

U.S. PATENT DOCUMENTS

| | | | | |
|---|---|---|---|---|
| 5,643,086 | A | 7/1997 | Alcorn et al. | |
| 5,851,149 | A | 12/1998 | Xidos et al. | |
| 5,970,143 | A * | 10/1999 | Schneier et al. | 713/181 |
| 5,970,149 | A * | 10/1999 | Johnson | 714/46 |
| 6,110,043 | A | 8/2000 | Olsen | |
| 6,152,824 | A * | 11/2000 | Rothschild et al. | 463/42 |
| 6,178,510 | B1 | 1/2001 | O'Connor et al. | |
| 6,217,448 | B1 | 4/2001 | Olsen | |
| 6,241,608 | B1 | 6/2001 | Torango | |
| 6,264,561 | B1 | 7/2001 | Saffari et al. | |
| 6,383,076 | B1 * | 5/2002 | Tiedeken | 463/40 |
| 6,394,907 | B1 * | 5/2002 | Rowe | 463/42 |
| RE37,885 | E | 10/2002 | Acres et al. | |
| 6,557,054 | B2 | 4/2003 | Reisman | |
| 6,629,019 | B2 * | 9/2003 | Legge et al. | 700/237 |
| 6,645,077 | B2 * | 11/2003 | Rowe | 463/42 |
| 6,656,048 | B2 | 12/2003 | Olsen | |
| 6,722,986 | B1 | 4/2004 | Lyons et al. | |
| 6,830,515 | B2 * | 12/2004 | Rowe | 463/42 |
| 6,840,860 | B1 * | 1/2005 | Okuniewicz | 463/35 |
| 6,854,012 | B1 | 2/2005 | Taylor | |
| 6,884,173 | B2 * | 4/2005 | Gauselmann | 463/42 |
| 6,884,174 | B2 * | 4/2005 | Lundy et al. | 463/42 |
| 6,886,013 | B1 | 4/2005 | Beranek | |
| 6,908,387 | B2 | 6/2005 | Hedrick et al. | |
| 6,934,846 | B2 | 8/2005 | Szrek et al. | |
| RE38,812 | E | 10/2005 | Acres et al. | |
| 6,965,992 | B1 * | 11/2005 | Joseph et al. | 713/153 |
| 7,046,134 | B2 * | 5/2006 | Hansen | 340/506 |
| 7,159,765 | B2 * | 1/2007 | Frerking | 235/375 |
| 7,179,170 | B2 * | 2/2007 | Martinek et al. | 463/29 |
| 7,258,612 | B2 * | 8/2007 | Fujimoto | 463/29 |
| 7,304,578 | B1 * | 12/2007 | Sayers et al. | 340/572.3 |
| 7,641,555 | B2 * | 1/2010 | McKinley et al. | 463/43 |
| 7,686,688 | B2 * | 3/2010 | Friedman et al. | 463/25 |
| 2002/0039923 | A1 * | 4/2002 | Cannon et al. | 463/42 |
| 2002/0049909 | A1 * | 4/2002 | Jackson et al. | 713/188 |
| 2002/0071557 | A1 | 6/2002 | Nguyen | |
| 2002/0116615 | A1 * | 8/2002 | Nguyen et al. | 713/168 |
| 2002/0152120 | A1 * | 10/2002 | Howington | 705/14 |
| 2003/0014639 | A1 | 1/2003 | Jackson et al. | |
| 2003/0150915 | A1 | 8/2003 | Reece | |
| 2003/0153375 | A1 | 8/2003 | Vancura | |
| 2003/0181231 | A1 | 9/2003 | Vancura et al. | |
| 2003/0195037 | A1 * | 10/2003 | Vuong et al. | 463/29 |
| 2003/0203755 | A1 | 10/2003 | Jackson | |
| 2003/0203756 | A1 | 10/2003 | Jackson | |
| 2003/0228912 | A1 * | 12/2003 | Wells et al. | 463/43 |
| 2004/0002378 | A1 | 1/2004 | Acres et al. | |
| 2004/0038735 | A1 | 2/2004 | Steil et al. | |
| 2004/0048657 | A1 * | 3/2004 | Gauselmann | 463/25 |
| 2004/0048671 | A1 * | 3/2004 | Rowe | 463/42 |
| 2004/0082384 | A1 * | 4/2004 | Walker et al. | 463/40 |
| 2004/0092304 | A1 | 5/2004 | George et al. | |
| 2004/0097285 | A1 * | 5/2004 | Fisher et al. | 463/24 |
| 2005/0113172 | A1 | 5/2005 | Gong | |
| 2005/0116020 | A1 * | 6/2005 | Smolucha et al. | 235/375 |
| 2005/0148393 | A1 | 7/2005 | Crumby | |
| 2005/0192099 | A1 | 9/2005 | Nguyen et al. | |
| 2006/0093142 | A1 * | 5/2006 | Schneier et al. | 380/251 |
| 2006/0116194 | A1 | 6/2006 | Pacey et al. | |
| 2006/0166731 | A1 | 7/2006 | Yoshimi et al. | |
| 2006/0166735 | A1 | 7/2006 | Steil et al. | |
| 2006/0183537 | A1 | 8/2006 | Dickerson | |
| 2006/0217202 | A1 * | 9/2006 | Burke et al. | 463/42 |
| 2007/0021194 | A1 | 1/2007 | Aida | |
| 2007/0032288 | A1 * | 2/2007 | Nelson et al. | 463/16 |
| 2008/0058059 | A1 * | 3/2008 | Fitzsimons et al. | 463/20 |

FOREIGN PATENT DOCUMENTS

| | | |
|---|---|---|
| AU | 655801 | 3/1992 |
| WO | 2008048465 A3 | 4/2008 |

OTHER PUBLICATIONS

"One Link BSK100 Slot System Architecture"; Paltronics, Inc.; 1 page; Date Unknown.

"Hot Potato™ —Compliance Manual"; Mikohn; 21 pages; Jun. 1, 1999.

"One Link LSK500 Slot System Architecture"; Paltronics, Inc.; 1 page; Date Unknown.

"Mikohn Mystery DCU Controller—Technician's Installation and Configuration Guide"; Mikohn; 53 pages; Apr. 10, 2002.

"One Link Media Network Diagram (Standard Configuration)"; Paltronics, Inc.; 1 page; Date Unknown.

"Media Systems Solutions"; Paltronics, Inc.; Brochure; 8 pages; Date Unknown.

"Slot Systems Solutions"; Paltronics, Inc.; Brochure; 12 pages; Date Unknown.

"System Comparison Chart"; Paltronics, Inc.; 1 page; Date Unknown.

"Mikohn MoneyTime® —Technician's Installation and Configuration Guide"; Mikohn; 63 pages; Jul. 3, 2002.

"IGT Mystery Progressive Jackpot—User Manuel"; Mikohn; 22 pages; Mar. 1995.

"Random Bonus Jackpot Users Manual"; Mikohn; 18 pages; Dec. 1995.

"One Link Ultimate Media System UMS5000"; Paltronics, Inc.; 1 page; Date Unknown.

"One Link Ultimate Media Client System UMS5000-Client"; Paltronics, Inc.; 1 page; Date Unknown.

"One Link Streaming Server UMS5000-SS"; Paltronics, Inc.; 1 page; Date Unknown.

PGP, sourced from http://web.archive.org/200605050947754/http://www.imss.caltech.edu/cms.php?op=view&id=244, last updated 2003.

U.S. Office Action mailed Aug. 19, 2008, from Application No. 11/582,134. [IGT1P593].

* cited by examiner

SECURE PROGRESSIVE CONTROLLER

RELATED APPLICATIONS

This application claims priority to and is a continuation-in-part of U.S. patent application Ser. No. 11/582,134 entitled Progressive Controller filed on Oct. 16, 2006 which is currently pending.

BACKGROUND OF THE INVENTION

1. Field of the Invention

The present invention relates to gaming and in particular to a method and system for secure configuration and operation of a progressive game network.

2. Related Art

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of games and potential for increased winnings associated with these games, such as enhanced bonuses, progressive awards, and various prizes.

As is well known in the art and as used herein, the terms "gaming" and "gaming devices" are used to indicate that some form of wagering is involved, and that players must make wagers of value, whether actual currency or some equivalent value, e.g., token or credit. This is in contrast to the playing of non-wagering games, which implies the absence of a wager of value, and the possibility of receiving a payout; and in which skill is ordinarily an essential part of the non-wagering game.

There are many different bonus incentives that a gaming establishment may offer to entice a player to place a wager at the gaming device. An example of such a bonus is a progressive award or jackpot that accumulates over time and increases based on the number of players participating. In a progressive award, a cumulative portion of the wagers placed on the associated gaming devices is added to the progressive amount. Correspondingly, the more players that participate in the progressive award the larger and faster the award accumulates.

Gaming establishments frequently participate in a wide selection of progressive based award programs. The gaming establishments commonly assign a designated group of gaming devices to a progressive award type. Further, a gaming establishment may be required to account for each gaming device associated with the progressive award, such as by paying a use fee or license fee to a manufacturer or distributor for the progressive system. The use fee or license fee can be paid on a daily basis for each gaming device (which could be a slot machine, video poker machine, video table game such as Tablemax®, or a mobile gaming device) offering the progressive award which could include a mystery progressive.

In general, a progressive controller is utilized to oversee and control operation of the progressive system. The progressive controller often communicates with the gaming machines and hence manages the progressive for each machine. One drawback of existing systems is that the configuration of a progressive controller may be altered to establish an improper progressive controller configuration. In the event a progressive controller configuration is modified, the gaming establishment may face significant risk of financial injury because the progressive controller configuration may pay an award that is excessive or provide awards too often.

In the existing progressive controllers, the progressive controller settings are usually accessed by way of a password protected logon procedure. While password protection is somewhat beneficial, this type of protection is vulnerable in several respects. First, a password may be shared among several users and once the password is out of the direct control of the password owner, the security of password protection is compromised. Second, passwords may be anticipated. For example, many people will use their birthday, pet's name or a nickname for a password. Thus, a person wishing to guess or anticipate the password may initiate the process by researching the password owner's background and then using the owner's common information, such as a birthday, in an attempt to hack the password. Third, a password may be inadvertently observed by another individual during the login process. Finally, the actual entry of the password may be recorded by an algorithm or other type of data logging device.

Another drawback with existing progressive controllers is that the progressive system manufacturer has little or no control over the number of gaming devices that may be connected to the progressive award system. Commonly in the gaming industry, a gaming establishment will agree to pay a fee for each gaming device connected to the progressive controller. The agreement will frequently limit and specifically designate the number of gaming devices that may be connected to the progressive controller. In this way, if the gaming establishment increases the number gaming devices or groups of gaming devices, the establishment is pay an additional fee. Undesirably however, existing progressive controllers permit the gaming establishment to connect additional gaming devices to the progressive award system without paying an additional fee.

Existing progressive controllers have another drawback that requires dedicated and proprietary computer software to access the controller configurations. Currently in order to access a progressive controller, a gaming establishment employee is required to use a computer (such as a laptop or portable device) with installed proprietary computer software for gaining access to various parameters and settings of the progressive controller. As a result, this requires installation of the proprietary computer software on each computer used to access a progressive controller. This is undesirable because each installation of the proprietary software has to be maintained and updated by the gaming establishment to ensure compatibility between the various computers and progressive controllers.

Another drawback of presently employed progressive controllers is the requirement of manual entry of system parameters for configuring the controller. Each gaming device connected to the progressive controller has a plurality of parameters such as denomination, game structure and payout percentages. These parameters are entered into each gaming device, manually recorded by a gaming establishment employee and then input into the progressive controller. This process is time consuming and inefficient because there may be many gaming devices connected to a progressive controller and each gaming device's settings has to be manually recorded and input into the controller. Additionally, the manual process of recording the parameters and subsequently inputting the parameters into the progressive controller is vulnerable to data input errors. These errors can have a catastrophic effect on the profitability of the gaming device and progressive controller system because large jackpots or awards may be paid out based upon erroneous configuration parameters.

As a result, there is a need in the art for a progressive controller which overcomes the drawbacks inherent in the prior art. The method and apparatus described herein overcomes these drawbacks and provides additional new and useful benefits.

SUMMARY OF THE INVENTION

To overcome the drawbacks of the existing systems and provide additional benefits, a method and system is disclosed which securely configure a progressive award system, verifies and permits only the licensed number of gaming devices to access the system.

In one embodiment, a system for configuring and authenticating a progressive game network is disclosed which comprising a first electronic security key, a second electronic security key, and a progressive controller. The progressive controller comprises an integrated key interface, which is configured to receive the first electronic security key or the second electronic security key. The progressive controller further comprises memory having machine readable code stored thereon. The machine readable code is configured to authenticate the first electronic security key or the second electronic security key when the first electronic security key or the second electronic security key is in the key interface. If the authentication is successful, then the code permits programming of the progressive controller or operation of a predetermined number of game devices associated with the progressive controller based on whether the first electronic security key or the second electronic security key was authenticated In one embodiment, the first electronic security key and the second electronic security key comprise a processor and memory. Furthermore, the first electronic security key may comprise a programming key and the second electronic security key may comprise a run key. Additionally, the run key may further comprise an expiration parameter which, when expired, prevents operation of the run key, the progressive controller, or both. Furthermore, the run key and/or programming key may also comprise a threshold parameter that determines the reset limit and/or the maximum jackpot amount of the progressive controller.

In still another embodiment the machine readable code is further configured to, as part of the authentication, perform a calculation on a value sent to the first electronic security key or the second electronic security key and compare a value resulting from the calculation to a value received from the first electronic security key or the second electronic security key.

In one embodiment, the invention further comprises a gaming machine interface configured to disable one or more aspects of the game device if the authentication is unsuccessful. The authentication may compare data stored within the electronic security key with data stored within the progressive controller.

Also disclosed herein is a system for configuring and authenticating a progressive game network. The system comprises at least one electronic security key configured to interface with a progressive controller. In one embodiment the progressive controller further comprises at least one key interface configured to receive at least one electronic security key and at least one input/output port configured to interface with one or more gaming device interfaces associated with one or more gaming devices, Also part of this embodiment is an authenticator configured to interface with the at least one electronic security key. The authenticator is used to authenticate at least one electronic security key and enable operation of the progressive controller if the authentication was successful. Conversely, if the authentication is unsuccessful, the authenticator disables operation of the progressive controller, gaming device interfaces or both. Another embodiment has an authenticator that comprises hardware, software or a combination of both. Additionally, in one embodiment the at least one electronic security key comprises a programming key and a run key. In another embodiment the progressive controller is configured to operate a predetermined number of game devices only if at least one run key is interfacing with the key interface and if the at least one run key authenticates.

Also disclosed herein is a method of configuring a progressive system. The method includes receiving a electronic security key into a key interface, such that the key interface is associated with a progressive controller and the electronic security key is configured to enable configuration of the progressive controller. The method further comprises interrogating the electronic security key and correspondingly if, the interrogation was successful, then displaying at least one progressive controller parameter modification options. The method next enables modifying one or more progressive controller parameters and storing the modified parameters in the progressive controller. Next, this method removes the electronic security key from the key interface and un-displaying the at least one progressive controller parameter modification options.

In one variation, the step of interrogating comprises analyzing data received from the electronic security key. The interrogating may further comprise generating a first value within the progressive controller and sending the first value from the progressive controller to the electronic security key. The method then processes the first value within the electronic security key to generate second value and processes the first value within the progressive controller to generate a third value. Finally, this method compares the second value to the third value. Additionally, in one embodiment, the step of interrogating repeats one or more times during the displaying and modifying.

In another embodiment, the method also displays at least one progressive controller parameter modification options that comprise displaying one or more menu options for software configuration. Additionally, this method may receive a electronic security key that disables operation of the progressive system with respect to a predetermined number of game devices connected thereto.

Similarly, disclosed herein is a method of enabling operation of a progressive system by receiving a electronic security key into a key interface such that the key interface is associated with a progressive controller and the electronic security key is configured to enable operation of the progressive controller. The method further comprises interrogating the electronic security key and if the interrogation was successful, then enabling operation of a predetermined number of game devices coupled with the progressive system. Conversely, if the interrogation was unsuccessful, then the method disables operation of the progressive system. The method also comprises operating the progressive system, and intermittently monitoring for the presence of and interrogating the electronic security key while the progressive system is operating. If the monitoring was successful then enabling operation of the progressive system. If the monitoring unsuccessful, then disabling operation of the progressive system.

In another embodiment, the interrogating step comprises analyzing data received from the electronic security key. Additionally, in one embodiment, the interrogating comprises generating a first value within the progressive controller and then sending the first value from the progressive controller to the electronic security key. The process then processes the first value within the electronic security key to generate a second value (which may be encrypted) and processing the first value within the progressive controller to generate a third value. This embodiment then compares the second value to the third value. In another embodiment, the step of interrogating repeats one or more times during the operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
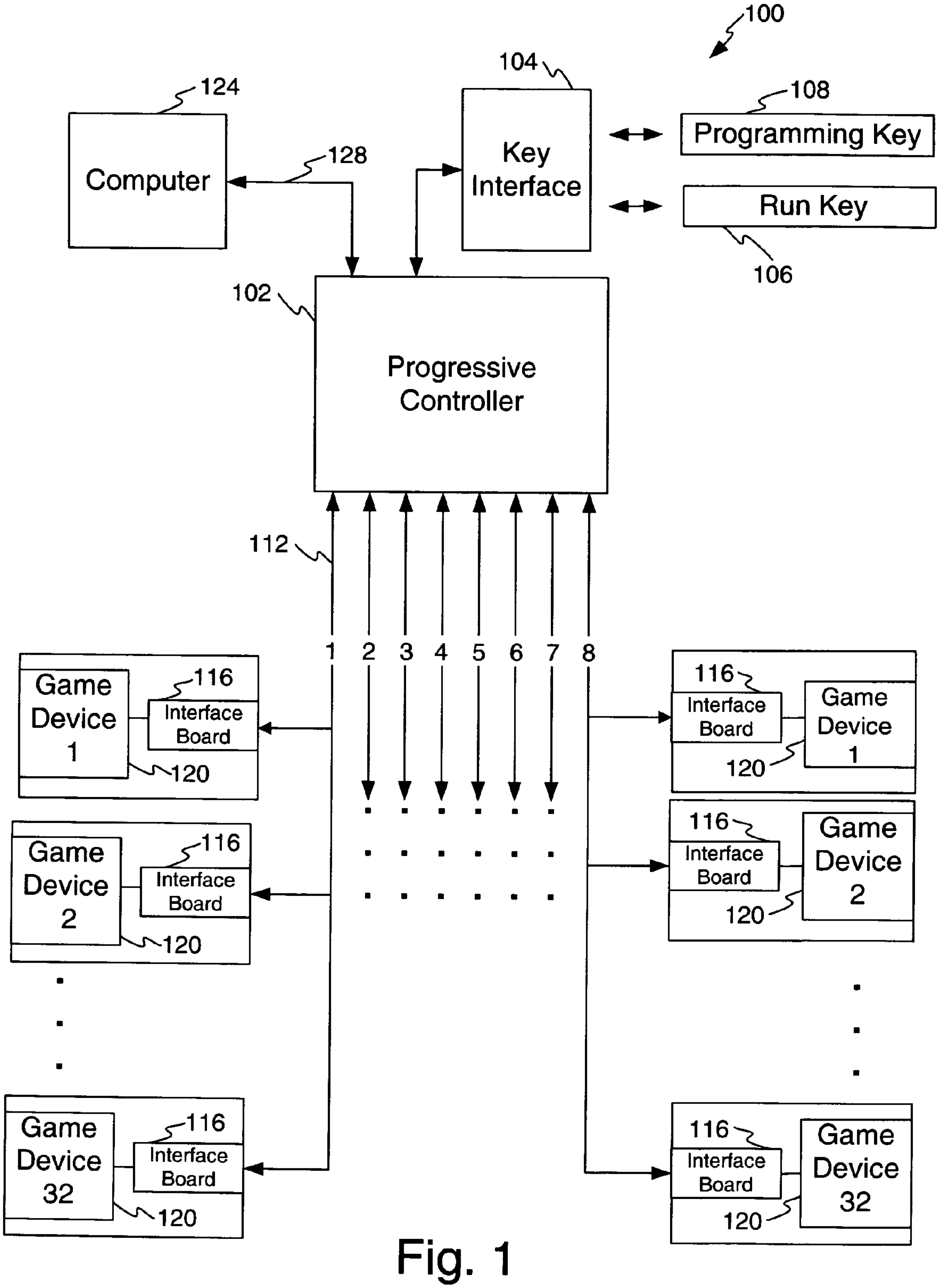
FIG. 1 illustrates a progressive game network with a plurality of gaming devices in communication with a progressive controller.

Referring now to the drawings, FIG. 1 illustrates a progressive game network 100. As seen in FIG. 1, a progressive controller 102 connects and controls the progressive game network 100. The progressive controller 102 monitors the game devices 120 that are connected to the game network 100. The progressive controller 102 also manages the progressive award by performing various accounting procedures (including but not limited to how much of each wager is incremented to the progressive and how much is placed in a reserve account for reseeding a progressive) regarding the amount wagered at each of the game devices 120 associated with the game network 100. The progressive controller 102 assigns a predetermined portion of the amounts wagered at each game device 120 to the progressive award amount. The progressive controller 102 also provides a series of menus displayed on a computer 124 for facilitating configuration of the various progressive awards that may be active on the game network 100.

In an alternate embodiment, the progressive controller 102 is contained within a central server which could include a thin client form or using downloadable games (not shown). A central server connects to game devices 120 and provides communication between the progressive controller 102 and associated game devices. Additionally, the central server may provide game information to the game devices. The information includes game rules, game graphics, game sounds and game outcomes.

The key interface 104, integrated within the controller 102, is configured in this example embodiment to accept a single electronic security key such as a run key 106 or a programming key 108. The electronic security keys are discussed in greater detail below. The key interface 104 facilitates communication between the electronic security keys and the progressive controller 102 by way of a bi-directional communication link.

A plurality of bi-directional communication channels 112 are provided for two-way communication between the progressive controller 102 and a series of game devices 120. Communication between the progressive controller 102 and game device 120 is facilitated by an interface board 116. In this example embodiment the progressive controller 102 has eight or more channels 112, and each channel operatively connects 32 or more game devices 120 to the progressive controller. In one embodiment the progressive controller 102 handles 256 or more associated game devices 120 (i.e. eight channels each connecting 32 game devices for a total of 256). It is contemplated that in other embodiments different number of channels or connections may be provided.

The progressive controller 102 communicates with a computer 124 by way of a bi-directional communication link 128. In one embodiment the computer 124 may be replaced with other computing devices such as a desktop computer or handheld device (e.g., a personal data assistant (PDA)). In one embodiment the communication link 128 is a secure Ethernet type communication link or USB connection, however, other types of secure communication links may be used such as, serial connections, dial-up or wireless connections. Alternatively, the connection 128 may occur via a network connection.

In one embodiment, the game device 120 is configured as a slot-type gaming device. A slot-type game device typically has a plurality of physical reel assemblies with various indicia located around the circumference of the reel. The game device provides control means for receiving a wager, activating and spinning the reels, stopping the reels, determining an outcome, and paying an award if applicable. During play of the slot-type game device, the player attempts to receive a predetermined arrangement of the indicia. The indicia are then compared against a pay table for determination of any possible winning outcomes.

In another embodiment, the game device 120 comprises a video-type game device. A video-type game device includes a computer generation or representation of the mechanical reels of the slot-type game device described above.

A video-type game device may include video poker such as Double Bonus. The video-type game device may comprise a series of games that are different from the common slot type game. Some examples of these alternate types of games would be various card games (poker, twenty-one, baccarat, etc.), keno, roulette or dice games. In the video type game device, there is a computer or microprocessor which is enabled to accept a wager, display a game, determine a game outcome and pay an award if applicable. The game device also provides a means for currency handling, receiving player inputs and a game display for displaying game play.

In either of the game devices 120 previously discussed (e.g., slot-type or video-type), there is an interface board 116 installed therein. The interface board 116 connects the internal microprocessor of the game device 120 and the progressive controller 102. Additionally, the interface board 116 provides controls and processing means for sending and receiving communications over the game network 100.

Figure 2:
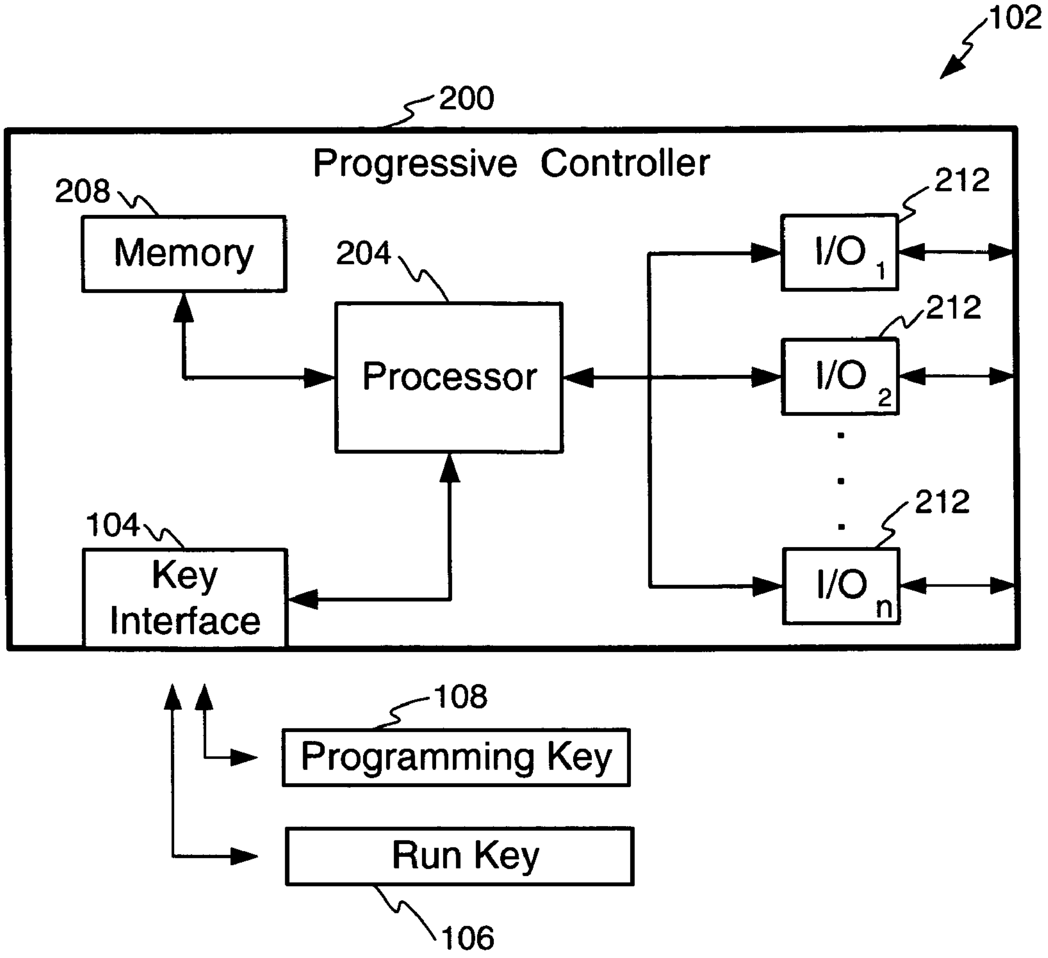
FIG. 2 is a block diagram of an example embodiment of a progressive controller.

FIG. 2 illustrates a block diagram of an example embodiment of the progressive controller 102. Internal to the progressive controller housing 200 is a processor 204 for running various executable codes that facilitate operation of the progressive game network 100. The executable code is stored within memory 208 and the executable code is accessed by the processor 204 through a bi-directional communication link between the processor 204 and memory 208. The memory 208 may be volatile, non-volatile or a combination of both. Examples of memory 208 include random access memory, optical disk drive technology, magnetic disk drive technology, read only memory, secured digital memory card or other types of computing memory now known or later developed.

In this example embodiment, there are several input/output ports 212 associated with and operatively connected to the processor 204. The I/O ports 212 facilitate communication between the progressive controller 102 and the game devices 120. In this example embodiment there is one I/O port 212 for each channel associated with the progressive game network 100.

The progressive controller 102 is further configured with a key interface 104. The key interface 104 is structured to operatively accept a single electronic security key (i.e., either a programming key or a run key) and is further structured to facilitate bi-directional communication between the processor 204 and the inserted electronic security key.

In one embodiment and to provide additional security, the key interface 104 is only accessible by unlocking a portion of the progressive controller housing 200. Once unlocked, a user may insert or replace a electronic security key (i.e., replace a run key with a programming key or vise-a-versa).

A programming key 108 is configured with progressive system parameters and establishes the progressive controller 102 configuration and permits access to the various progressive award configuration menus associated with the progressive controller. The programming key 108 is used to access the configuration menus and may be assigned to a particular designated employee of the gaming establishment. In this way, the designated employee is paired with the particular programming key 108 and is responsible for the proper use of the programming key. A "gaming establishment" is defined as an operator of game devices and may comprise a casino, riverboat, cruise ship, lounge, or other business entity providing gaming activities.

In this example embodiment the programming key 108 has substantially identical internal configuration as a run key 106, discussed below, except for a data bit modification that identifies the programming key, as such, to the progressive controller 102. The data bit modification may be a flagged memory location, a "dip" switch setting, or a particular jumper arrangement internal to the programming key structure. It is contemplated that the programming key data bit modification provide adequate security from tampering and further provide distinguishing characteristics from the run key 106. Correspondingly, once the programming key 108 is inserted into the key interface 104, and because of the data bit modification, the progressive controller 102 will automatically recognize the key as a programming key 108.

In operation, the programming key 108 controls access to the progressive controller configuration settings and parameters. Upon insertion of the programming key 108 into the key interface 104, the progressive controller 102 presents a series of progressive controller configuration menus to the user which would not otherwise be visible or accessible. The key interface 104 is configured to accept only one electronic security key at a time, and thus any electronic security key previously inserted into the key interface 104 is required to be removed before another key can be inserted.

In one exemplary method of operation, once the programming key 108 inserted into the key interface 104, any game devices 120 connected to the progressive controller 102 will be automatically disabled and not available for game play while the programming key remains inserted into the key interface. In this way, when a programming key 108 is inserted in to the key interface 104, the progressive game network 100 is inoperative with respect to accepting wagers and providing game play events. In another embodiment, only the progressive aspect is disabled.

A run key 106 is configured with run key parameters that are used to enable operation of the progressive network and authenticate the number of game devices 120 connected to the progressive controller 102. In this embodiment the run key 106 controls the number of game devices 102 that can access the progressive controller. In this embodiment the run key is inserted into the key interface 104 for the progressive game network 100 to function.

The run key 106 has substantially identical internal configuration as a programming key 108, discussed above, except for a data bit modification that identifies the run key, as such, to the progressive controller 102. The data bit modification may be a flagged location of memory, a "dip" switch setting, or a particular jumper arrangement internal to the run key structure. It is contemplated that the run key 106 data bit modification provide adequate security from tampering and further provide distinguishing characteristics from the programming key 108. Correspondingly, once the run key 106 is operatively inserted into the key interface 104, and because of the data bit modification, the progressive controller 102 will automatically recognize the key as a run key 106.

In operation, the run key 106 authenticates the number of game devices connected to the progressive controller 102. Upon insertion of the run key 106 into the key interface 104, the progressive controller 102 activates and permits authenticated game devices 120 to participate in the progressive award.

The key parameters, which are stored within the electronic security keys (i.e., run key 106 or programming key 208) comprise, but are not limited to: Gaming Establishment Customer Number, Maximum Number of Game Devices, Maximum Number of Progressives, Progressive Controller Serial Number, Key Serial Number, Key Expiration Parameters or other data considered pertinent to the operation of the progressive game network 100. Alone or in combination the progressive controller, the key provides security and authentication functionality for the progressive system.

Figure 3:
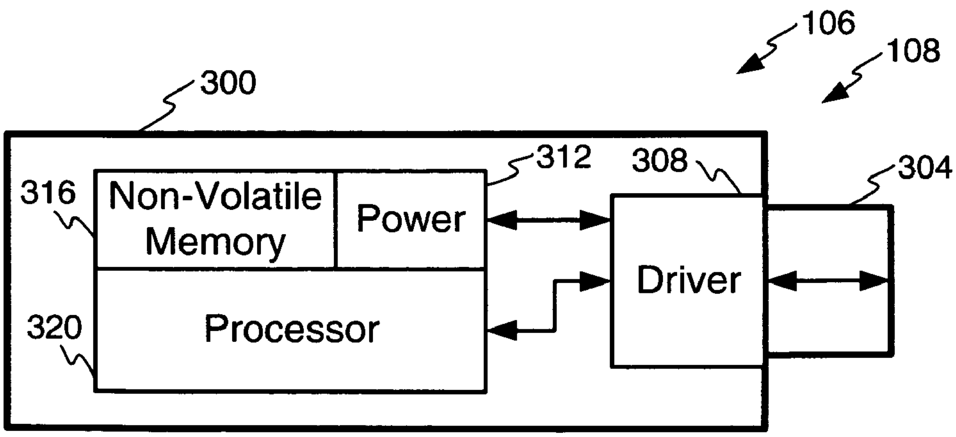
FIG. 3 is a block diagram of an example embodiment of a electronic security key.

FIG. 3 illustrates a block diagram of an exemplary key used in the present invention. The exemplary key of FIG. 3 is either a run key 106 or programming key 108. The key comprises a key housing 300 which provides structural support and encapsulation of the key's electronic components. A bi-directional communication connector 304 interfaces with the key interface 104. The communication connector 304 can be a universal serial bus (USB), firewire, serial, parallel or other type of connector now known or later developed that provides releasable engagement for an electrical device.

Internal to the electronic security key is a bi-directional communication driver 308 such as a RJ-45 driver or any other type driver. It is contemplated that the driver 308 facilitates bi-directional communication between the key and the progressive controller 102 through the key interface 104. The driver 308 additionally provides a power source conduit to the internal components of the key.

The electronic security key further comprises a power conditioner 312 that supplies power to the internal non-volatile memory 316 and the microprocessor 320. The power conditioner 312 transforms, filters or stores electrical power for use by the memory 316, microprocessor 320 or both.

The non-volatile memory 316 is accessible by the processor 320 and stores data, as described above, and configured to receive executable code for processing functionality. Some examples of non-volatile memory 316 are: flash memory, secured digital memory or other types of memory now known or later developed that provides for reliable and non-volatile data storage.

The microprocessor 320 provides data processing functionality to the electronic security key and is configured to access data and/or run executable code stored within memory 316. It is contemplated that the microprocessor 320 be selected such that the processor is capable of handling the frequent and constant polling by the progressive controller.

Figure 4:
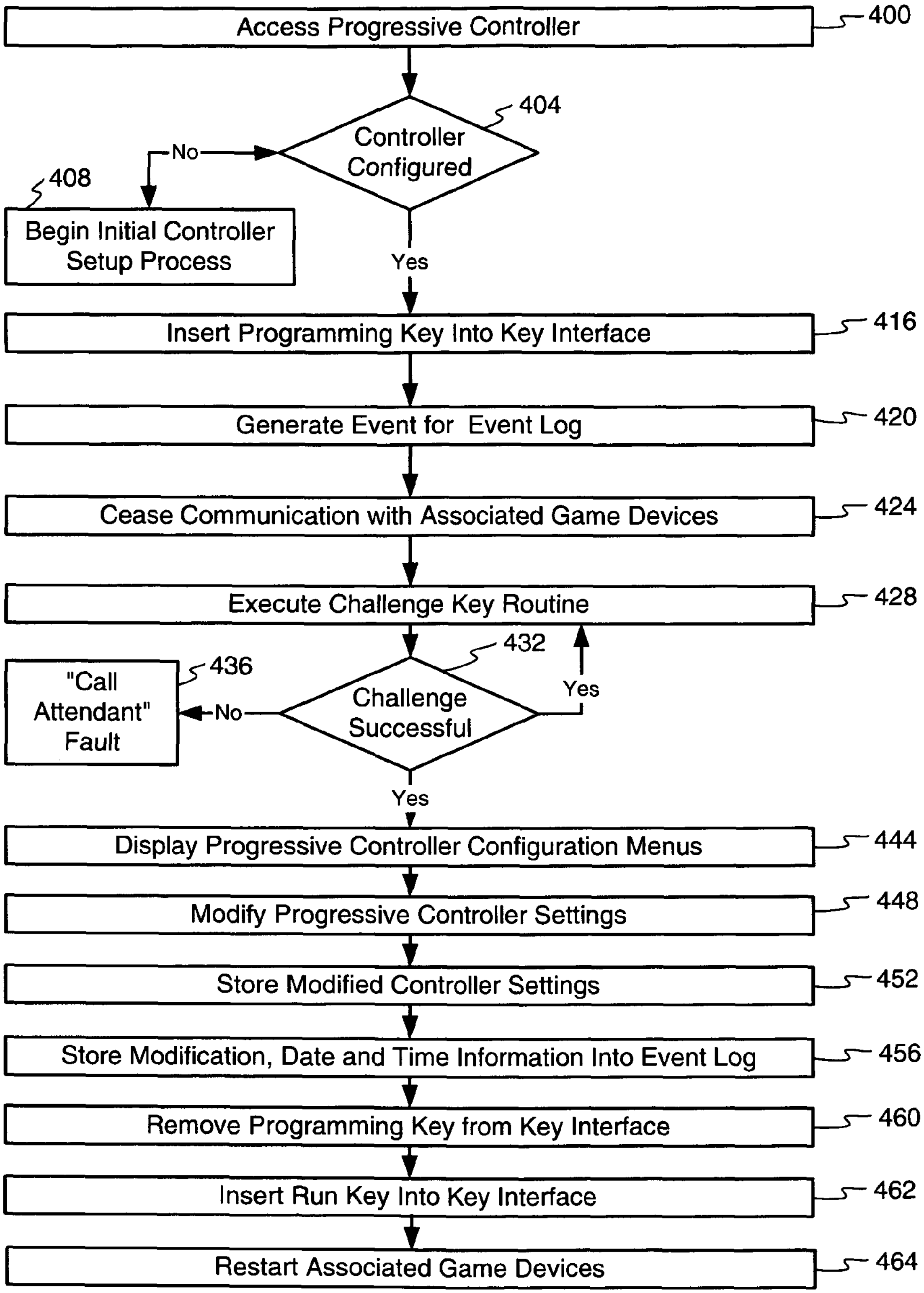
FIG. 4 is an operational flow diagram of one example embodiment for programming a progressive system.

FIG. 4 is an operational flow diagram illustrating potential steps for programming a progressive system. This is but one possible method of operation and as such, it is contemplated that other methods of operation may occur based on this disclosure. At a step 400, a user or other entity gains access to the progressive controller. In the preferred embodiment, the user would physically access the controller by opening and possibly unlocking the progressive controller security cabinet or housing. The progressive controller may have a computer display associated therewith or the user may connect another computer device (i.e., a laptop computer) to facilitate communication with the progressive controller.

Once the user has accessed the progressive controller the user next determines if the progressive system is configured. This occurs at a step 404. There are two possible outcomes of step 404, the first being that the controller is not configured. If the controller is not configured, then the progressive controller will require an initial controller setup 408 which is termed herein as "birthing". The birthing process establishes the progressive controller's settings and provides a baseline operating configuration.

The second possible outcome of step 404 may be that the progressive controller is already configured. If the controller is configured, then the operation advances to a step 416. At step 416, the user inserts the programming key into the key interface of the progressive controller to thereby gain access to the controller's configuration menus. Absent the programming key, the user may not access the configuration menus.

The key interface preferably has provision for insertion of only one electronic security key at a time. Correspondingly, during step 416 if there is a key already in the key interface it should be removed to provide an open receptacle for the programming key. For example, if the progressive game network was running there would be a run key installed into the receptacle of key interface. The run key would need to be removed before the programming key could be inserted and the progressive award system programmed or modified. After insertion of the programming key, the operation advances to a step 420 wherein an event is generated and stored in an event log. The event log is a continually running data acquisition system that records information pertaining to the status of the progressive controller and associated game network. Changes to the controller may be recorded in the event log. It is contemplated, that the generated event of step 420 records data regarding the event, such as but not limited to: date stamp, time stamp, listing of modifications and personnel identification associated with the programming key. The generated event data is subsequently stored within the progressive controller and preferably within a secure non-volatile memory device such as a secured digital memory card. Recording the events, such as changes to the progressive controller configuration provides the benefit of notifying the gaming establishment if there is a malfunction or if the game device reports a jackpot of an incorrect amount. As a result of recording events pertaining to the progressive controller configuration the gaming establishment can monitor and determine who and when any configuration parameters may have changed. The recorded event information provides an evidentiary trail with respect to who was responsible for the incorrect setup of the controller that caused the incorrect payout or other malfunction. Additionally, the recorded information provides gaming regulators a way to see if the gaming establishment has changed the parameters to cheat the customers or the tax collectors.

Next at a step 424, the progressive controller halts communication with the associated game devices. The communication over channels to game devices discontinues when the run key is either not present or removed from the key interface. In this way, the progressive controller enters into a programming mode when the run key is removed and the programming key is inserted into the key interface. At a step 428, the progressive controller executes a challenge key routine which verifies that the proper programming key has been inserted into the key interface. The challenge key routine is disclosed in greater detail below with reference to FIGS. 6A & 6B.

During the execution of the challenge routine 432 there are two possible outcomes. The first outcome is that the challenge routine was not successful. An unsuccessful challenge routine generates a fault error, such as a "Call Attendant" fault 436. When a "Call Attendant" fault 436 occurs, the progressive controller may become inoperative and require attention from casino management, security or both. Thus, a fault will bring attention to the situation where an inappropriate programming key has been used in an attempt to modify progressive award settings.

The second possible outcome is that the challenge routine was successful and in this situation there are two additional possible outcomes. First, in a successful key challenge, the positive outcome is redirected to execute the challenge key routine again. In this way, the challenge key routine cycles and continually verifies or authenticates the inserted programming key. In one embodiment, the challenge key routine may repeat every three to five seconds. However other time intervals may be utilized. Secondly, in a successful key challenge, the programming key is authenticated and the programming of the progressive controller proceeds to subsequent steps such as the display of configuration menus at a step 444.

At step 444, as a result of the successful challenge key routine the progressive controller displays one or more progressive award configuration menus. The configuration menus provide a convenient and intuitive interface for selecting, modifying and storing various progressive controller parameters. The available progressive parameters that can be configured depend upon the specific type of progressive award offered by the gaming establishment. For example, in a standard progressive some of the parameters that may be configured include: a base award amount, a reset amount and an increment rate. In a mystery progressive, the configurable parameters may include a base amount, minimum award amount, maximum award amount and an increment rate. These are just two examples of progressive awards and their configurable parameters. However one of ordinary skill in the art understands that there are other progressive award parameters specific to the play rules of the desired progressive system. Consequently, the progressive award parameters or settings can be modified at a step 448. Next, the modified progressive controller settings are securely stored within the progressive controller and preferably within controller memory.

Upon completion of the modification or configuration process, pertinent data is recorded in the event log at a step 456. The modification process data may include: a date stamp, time stamp, identification data, pre-modified parameters, post-modified parameters or other useful data regarding the modification process. The event log then subsequently stores the data with the progressive controller and preferably within controller memory.

Once the progressive controller has been adequately programmed or configured the programming key is removed from the key interface at a step 460. Subsequently, at a step 462, a run key is inserted into the key interface to place the progressive controller into a "run" mode. The progressive game network is then restarted at a step 464 and players may subsequently begin wagering at the game devices utilizing the new or modified progressive controller parameters/settings. As discussed below, in at least one embodiment the run key must be inserted into the controller interface for the progressive system to operate.

Figure 5:
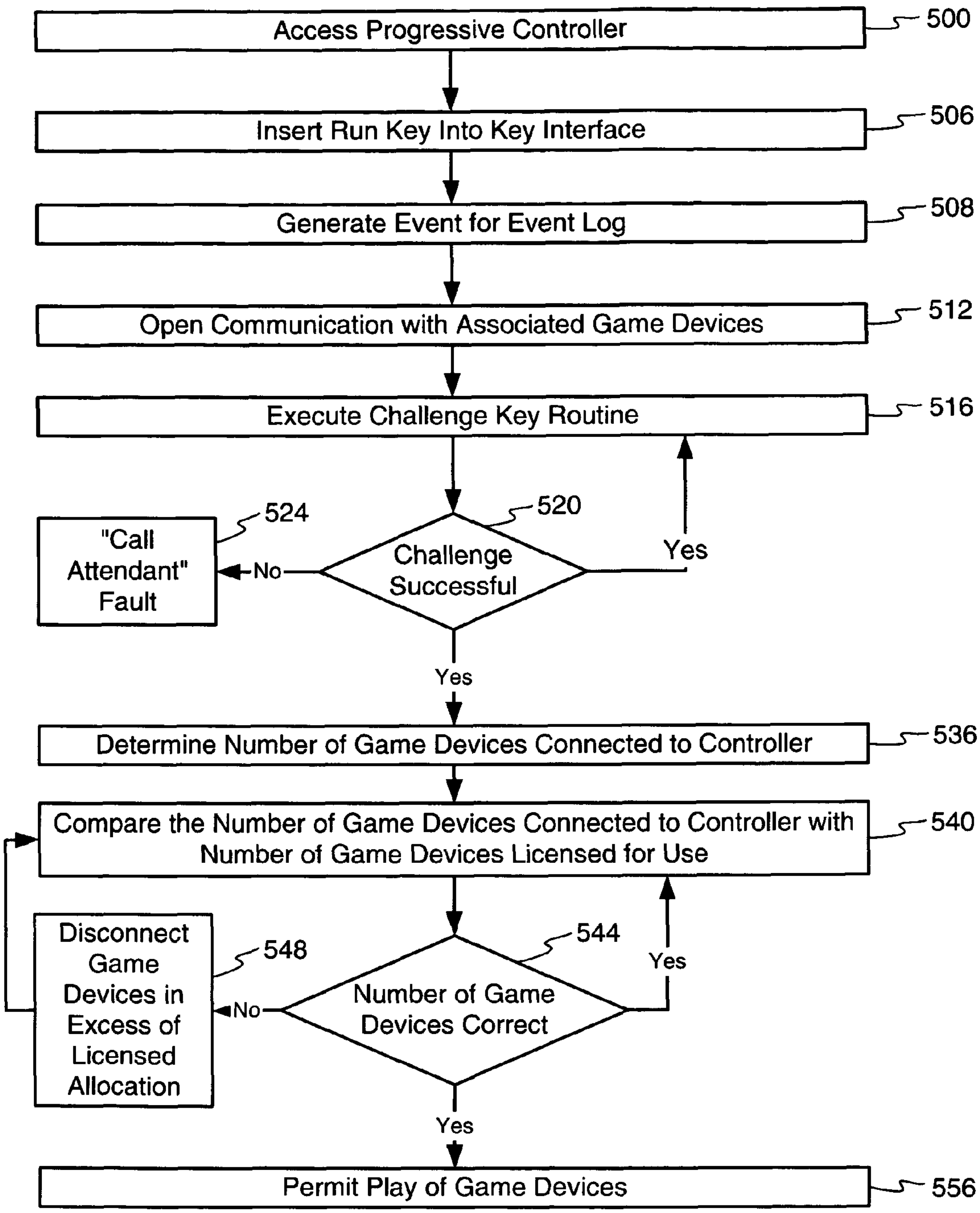
FIG. 5 is an operational flow diagram of one example embodiment for monitoring a progressive system.

Turning now to FIG. 5, which is an operational flow diagram illustrating potential steps for monitoring a progressive award system. At a step 500, the programming begins with accessing the progressive controller. In one embodiment, the user would physically access the controller by opening and possibly unlocking the progressive controller security cabinet or housing. The progressive controller may have computer display associated therewith or the user may connect another computer device to facilitate communication with the progressive controller.

The next step 506 is to insert the run key into the key interface of the progressive controller. The key interface preferably has provision for insertion of only one electronic security key at a time. Correspondingly, during step 506 if there is a key already in the key interface it may be removed to provide an open receptacle for insertion of the run key. For example, if the progressive game network was previously being programmed there would be a programming key installed into the key interface. The programming key would need to be removed before the run key could be inserted and the progressive award system monitored. After insertion of the run key, an event is generated and stored in the event log at a step 508. The event log is a continually running data acquisition system that records information pertaining to the status of the progressive controller. It is contemplated, that the generated event of step 508 may provide data such as: date stamp, time stamp, listing of modifications and personnel identification associated with the run key. The generated event data is subsequently stored within the progressive controller and preferably within a secure non-volatile memory device such as a secured digital memory card.

At a step 512, the progressive controller opens communication with the associated game devices. The communication over the channels to game devices is initiated when the run key is engaged with the key interface. In this way, the progressive controller enters into a run mode when the programming key is removed and the run key is inserted into the key interface. At a step 516, the progressive controller executes a challenge key routine which verifies that the proper run key has been inserted into the key interface. The challenge key routine is disclosed in greater detail below with reference to FIGS. 6A & 6B.

During the execution of the challenge routine 520 there are two possible outcomes. The first possible outcome is that the challenge routine was unsuccessful. An unsuccessful challenge routine results in a fault error, such as a "Call Attendant" fault 524. When a "Call Attendant" fault 524 occurs, the progressive controller may become inoperative and require attention from casino management, security or both. Thus, a fault error will bring attention to the situation where an inappropriate run key has been used to actively monitor or run the progressive game network.

The second possible outcome from step 520 is that the challenge routine was successful. First, in a successful key challenge, the operation returns to step 516 to execute the challenge key routine again. In this way the challenge key routine continually cycles and verifies or authenticates the inserted run key. In one embodiment, the challenge key routine repeats every three to five seconds. However other time intervals may be configured.

Secondly, in a successful key challenge, the run key is authenticated and the operation will proceed to subsequent steps such as determining the number game devices connected to the game network. At a step 536, the progressive controller polls or queries each of the game devices associated with the progressive system. The polling process provides the progressive controller with the number of game devices connected or logged onto the progressive system. At a step 540, the operation compares the number of connected game devices acquired at a step 536 to the actual number of game devices permitted for use by the gaming establishment. In one embodiment, the number of permitted game devices is stored in electronic data form within the run key. In this way, the run key provides the comparison value for the correct number of game devices that are permitted on the progressive game network.

After the comparison of step 540, there are two possible outcomes from a step 544. The first possible outcome is that the comparison was unsuccessful (i.e. the number of connected game devices exceeds the number of licensed game devices) and in this situation the excess game devices are excluded from the progressive game network. In one embodiment an excluded game device may display a fault error such as a "Call Attendant" fault. When a "Call Attendant" fault occurs, the game device may become inoperative and require attention from casino management, security or both. Additionally, after excluding excessive game devices, the process of step 544 is repeated in a continual cycle. It is contemplated that the comparison routine is repeated every three to five seconds. However, other time intervals may be implemented.

Game devices are excluded from the game network when the progressive controller ceases polling the particular game device. For example, the game device internal executable code is configured such that the code is expecting a polling inquiry from the progressive controller at predefined intervals of time. When the game device does not receive a polling request as expected, the game device enters into a fault mode and is no longer available to accept wagers or permit player interaction.

The second possible outcome from step 544, is that the comparison was successful, which in turn leads to the operation of two additional steps. Firstly, if the challenge was successful the operation returns to step 540 to execute the comparison routine again. In this way, the comparison routine continually cycles and verifies or authenticates that the number of connected game devices does not exceed the licensed number of permitted game devices. In one embodiment, the comparison routine repeats every three to five seconds. However, other time intervals may be adopted. Secondly, in a successful challenge routine, the number of connected game devices is authenticated and operation of the progressive system occurs at a step 556.

Figure 6A:
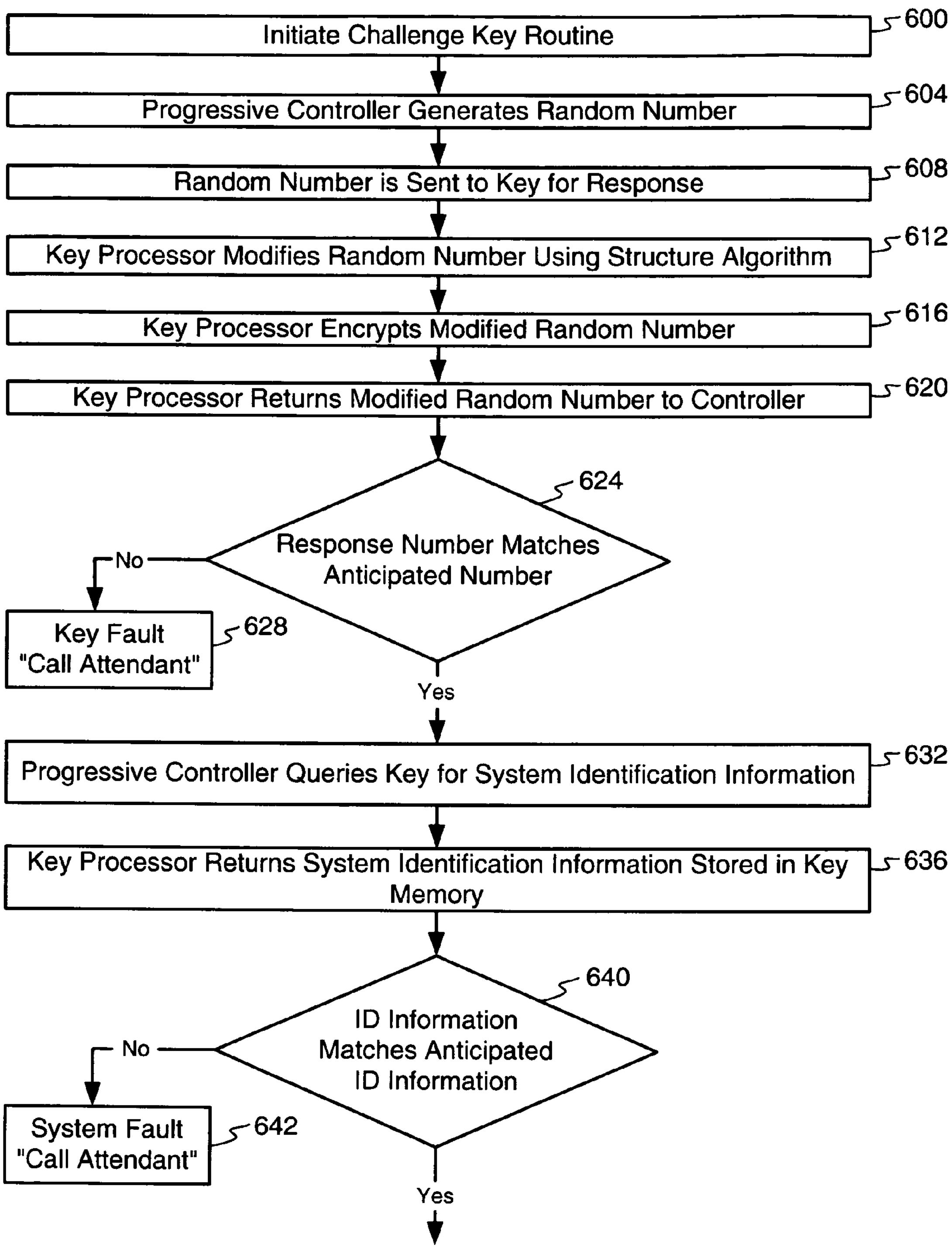
FIGS. 6A & 6B is an operational flow diagram of one example embodiment for verification of the electronic security key.

As introduced above, and referring to FIG. 6A, upon insertion of either the run key or programming key, the progressive controller initiates a challenge key routine at a step 600. The challenge key routine authenticates the electronic security keys and assures that the proper matched set of keys are inserted or used with the matching progressive controller. The challenge key routine proceeds, after initialization, by having the progressive controller generate a random number. This occurs at a step 604. At a step 608, the random number is sent to the particular electronic security key (e.g., run key or programming key) for response.

In one embodiment, when the electronic security key receives a randomly generated number from the progressive controller the key processor executes code stored within key non-volatile memory. It is contemplated that at a step 612, the executable code performs a modification of the random number by way of a predefined and structured algorithm. For example, the random number is modified by multiplying the number by a predetermined number. Subsequent to the modification process of step 612, the key processor encrypts the modified random number at a step 616. The number encryption may be performed by various types of encryption. One of ordinary skill in the art may implement other forms of encryption now known or later developed. It is further contemplated that the key processor returns the modified and encrypted random number at a step 620 to the progressive controller. Alternatively, this process may be reversed in that the key may generate the random number and forward it to the controller for modification.

At a step 624, a comparison is performed between the modified random number returned by the electronic security key and an anticipated number within the progressive controller. The anticipated number is generated by the progressive controller using executable code stored within progressive memory that performs a modification of the random number by way of a predefined and structured algorithm. In this way, the progressive controller generates a random number that is sent to the electronic security key and the progressive controller also generates a modified random number for use in the comparison.

In this example embodiment, there are two possible comparison outcomes which may occur at decision step 624. If the modified random number returned from the electronic security key does not mach the anticipated number generated by the progressive controller, then a key fault would be generated at a step 628. A key fault may generate a "Call Attendant" alarm which may be displayed upon the progressive controller, the associated game devices or both. When a "Call Attendant" alarm occurs, the progressive game network may become inoperative and require attention from casino management and/or casino security.

Alternatively, if at decision step 624 the modified random number returned from the electronic security key does match the anticipated number generated by the progressive controller then the challenge routine proceeds to a step 632 where the progressive controller subsequently queries for system identification information stored with in the non-volatile memory of the electronic security key.

In one embodiment it is contemplated that system identification information includes specific progressive game network parameters such as: Gaming Establishment Customer Number, Maximum Number of Game Devices, Maximum Number of Progressives, Progressive Controller Serial Number, Key Serial Number, Key Expiration Parameters or other data considered pertinent to the operation of the progressive game network.

At a step 636, the electronic security key returns system identification information stored within the key's non-volatile memory. In one embodiment the system identification information is encrypted by the key processor prior to transmission to the progressive controller. Next, at a step 640, a comparison is performed between the system identification information returned by the electronic security key and anticipated system identification information stored within the progressive controller.

In one embodiment, there are two possible comparison outcomes for the system identification information. If the system identification information returned by the electronic security key does not match the anticipated system identification information within the progressive controller then a system fault would be generated at a step 642. A system fault may generate a "Call Attendant" alarm which may be displayed upon the progressive controller, the associated game devices or both. When a "Call Attendant" alarm occurs, the progressive system may become inoperative and require attention from casino management and/or casino security.

Figure 6B:
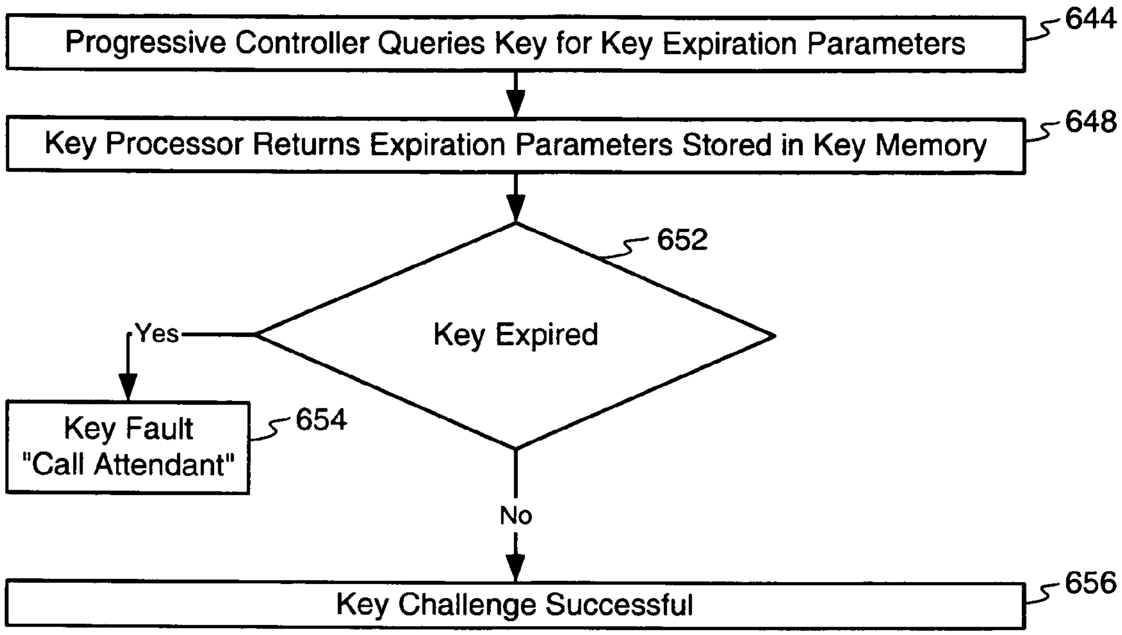

Alternatively, if the system identification information returned by the electronic security key does match the anticipated system identification information then the progressive controller continues the challenge routine, as shown in FIG. 6B, by proceeding to query the electronic security key for key expiration parameters at a step 644. A key expiration parameter may be a specific date, number of days-in-use, number of wagers played, an access counter or other parameters upon which the functionality of the electronic security key is scheduled to discontinue. In one configuration the expiration parameter is referred to as a gas tank. In one embodiment, the access counter may be included with the initial configuration of the electronic security key. Then as the progressive controller polls or queries the electronic security key, the access counter is incremented each time a polling or query is performed. In this way, the electronic security key has a finite pre-determined lifespan and when the access counter reaches a predefined value, the electronic security key becomes inoperable. It is contemplated that the access counter is incremented by either adding or subtracting polling/query events from the initial value of the access counter.

Next, the key processor returns the expiration parameter to the progressive controller. In one embodiment, the key processor encrypts the expiration parameter prior to returning the expiration parameter to the progressive controller. The parameter encryption may be performed by various types of encryption, however one of ordinary skill in the art may implement other forms of encryption now known or later developed.

At a decision step 652, the operation examines whether the key is expired. Based on the outcome of step 652, the operation advances. At a step 654 the system generates a key fault and displays a "Call Attendant" alarm. In this case, the challenge key routine would be considered unsuccessful. The key may expire due to the expiration parameter exceeding a predetermined threshold such as a fixed date, number of key access events (i.e., polling or queries), or other parameters that provide a means for controlling the operable lifespan of the electronic security key. Alternatively, if at step 652 the operation determines that the key has not expired then the operation advances to a step 656 and the key challenge routine is considered successful.

In another embodiment, the progressive controller polls the electronic security key. The progressive controller generates a random number that is the same size as the required data structure. This random number is scrambled by a pre-determined algorithm, which is the same algorithm also used by the electronic security key. As defined herein, the term "scrambled" refers to various types of data manipulation such as encrypting and/or code hashing by which these techniques are well know to one of ordinary skill in the art. The scrambled random number is then sent to the electronic security key. The electronic security key receives the scrambled random number from the progressive controller. Next, the electronic security key unscrambles the random number to obtain the original random number generated by the progressive controller. The electronic security key uses this original random number to scramble the data programmed in the electronic security key. The electronic security key scrambles the data in a predetermined fashion using the original random number and the scrambled data is sent back to the progressive controller. Upon receipt of the scrambled data, the progressive controller unscrambles the data using the original random number to unscramble the data using the same predefined algorithm used in the electronic security key. Additionally, included within the scrambled data is a cyclic redundancy check (CRC) calculation that is used to determine the validity of the data. This CRC is calculated on the received data after the descrambling of data and is compared to the transmitted CRC. If both of these CRC values are identical then the electronic security key data is determined valid.

As one of ordinary skill in the art will appreciate, a cyclic redundancy check (CRC) is a type of hash function used to produce a checksum—a small, fixed number of bits—against a block of data, such as a packet of network traffic or a block of a electronic data. The CRC checksum is used to detect errors after transmission and/or storage of data. A CRC is typically computed and appended before transmission or storage, and usually verified afterwards by the recipient of the data to confirm that no changes to the data occurred during transit.

Figure 7:
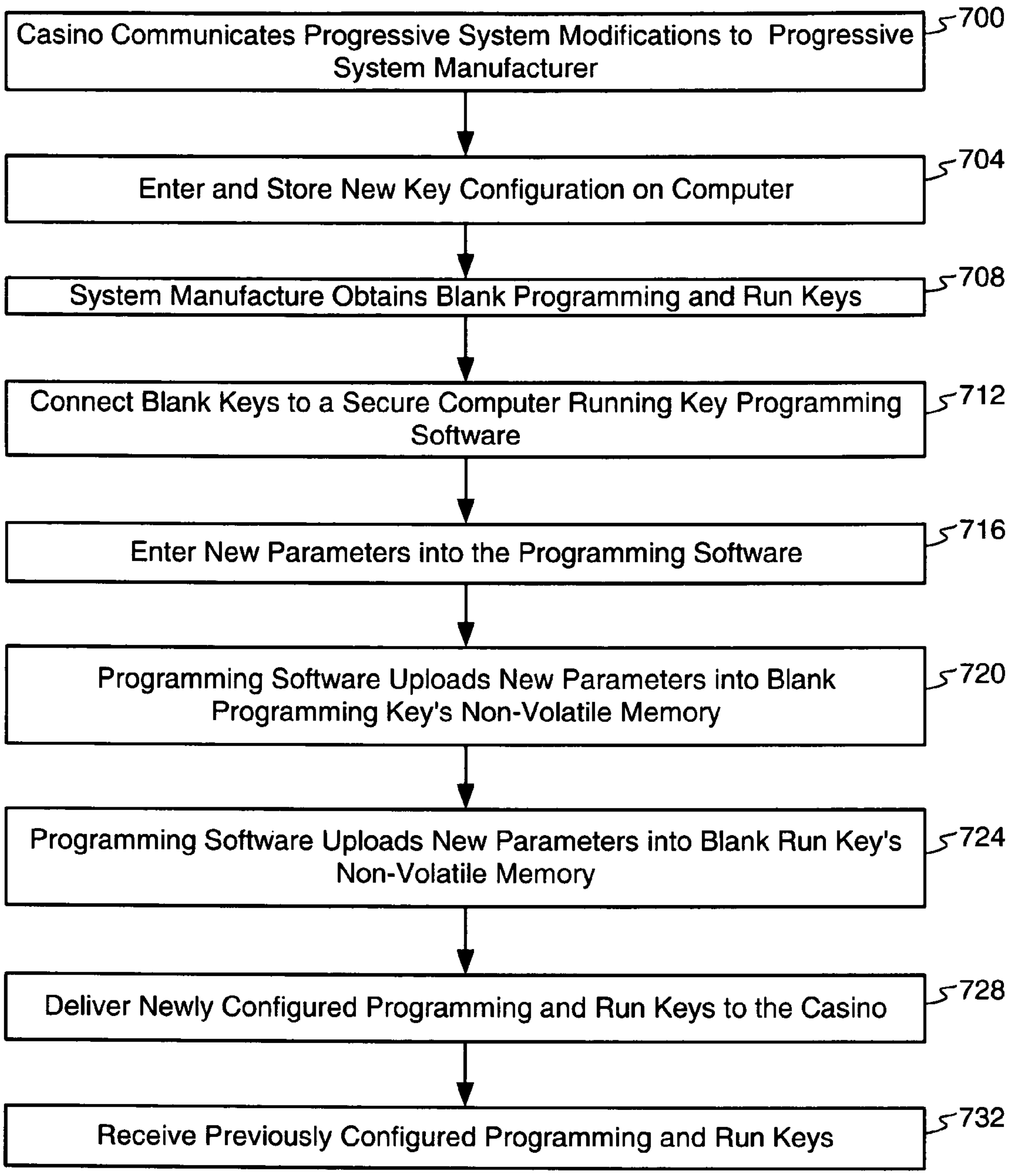
FIG. 7 is an operational flow diagram of one example embodiment for programming a pair of electronic security keys.

Reference is now made to FIG. 7, which is an operational flow diagram that illustrates potential steps for programming a pair of electronic security keys. It is contemplated, that a gaming establishment may want to implement various changes or modifications to an existing progressive system. Any type modification is possible, such as decreasing or increasing the number of game devices connected to the game network, altering the number progressive awards offered, or altering the type of progressive awards offered. Correspondingly, when the gaming establishment implements such modifications there are likely be changes to the fee owed by the gaming establishment to the progressive system manufacturer. The modifications may require reconfiguration or reprogramming of the electronic security keys to ensure that the progressive game network functions properly within the terms and conditions of an agreement. For example the key and controller parameter which limits the number of machines that connect to the controller must match the new configuration.

At a step 700, the gaming establishment or casino communicates progressive system modifications to the progressive system manufacturer. The communication occurs in any manner including telephone, written letter, email, facsimile or other communication techniques now known or later developed. Once the modifications are communicated to the system manufacturer, the modifications and new electronic security key configurations are entered and stored on a computer, this occurs at a step 704. The computer preferably has a comprehensive database for storing electronic configuration data.

At a step 708, the progressive system manufacture obtains a set of blank or unprogrammed electronic security keys (i.e. a run key and a programming key). The electronic security keys are connected to a secure computer running key programming software (executable code) at a step 712. The software has an interface for receiving input from a user, in which the input includes the progressive system modifications or new system parameters. The new parameters are entered into the programming software at a step 716.

Next, at a step 720, the new progressive system parameters are uploaded by the programming software into the blank programming key's non-volatile memory. Likewise, at a step 724 the programming software uploads the new parameters into the run key's non-volatile memory.

Upon successful uploading of the new progressive system parameters into both the run key and programming key, the newly configured electronic security keys are delivered to the gaming establishment or casino at a step 728. Next, at a step 732, the progressive system manufacture receives the previously programmed electronic security keys from the gaming establishment. It is contemplated, that the previously programmed electronic security keys must be returned to the system manufacturer to prevent having multiple sets of operable electronic security keys from being in the gaming establishment's possession, unless there is an enforceable agreement in effect for each set of operable electronic security keys.

In one embodiment, the newly configured/programmed electronic security keys are delivered to the gaming establishment prior to return of the previously programmed electronic security keys. In this way, the progressive system will continue to operate during the change in keys. This avoids the situation in which the gaming establishment is required to first return the previous programmed electronic security keys (i.e., causing the progressive system to be inoperative) and wait to receive a newly programmed set of electronic security keys. Conversely, in another embodiment, the gaming establishment returns the previously programmed keys prior to receipt of the newly programmed keys.

Figure 8:
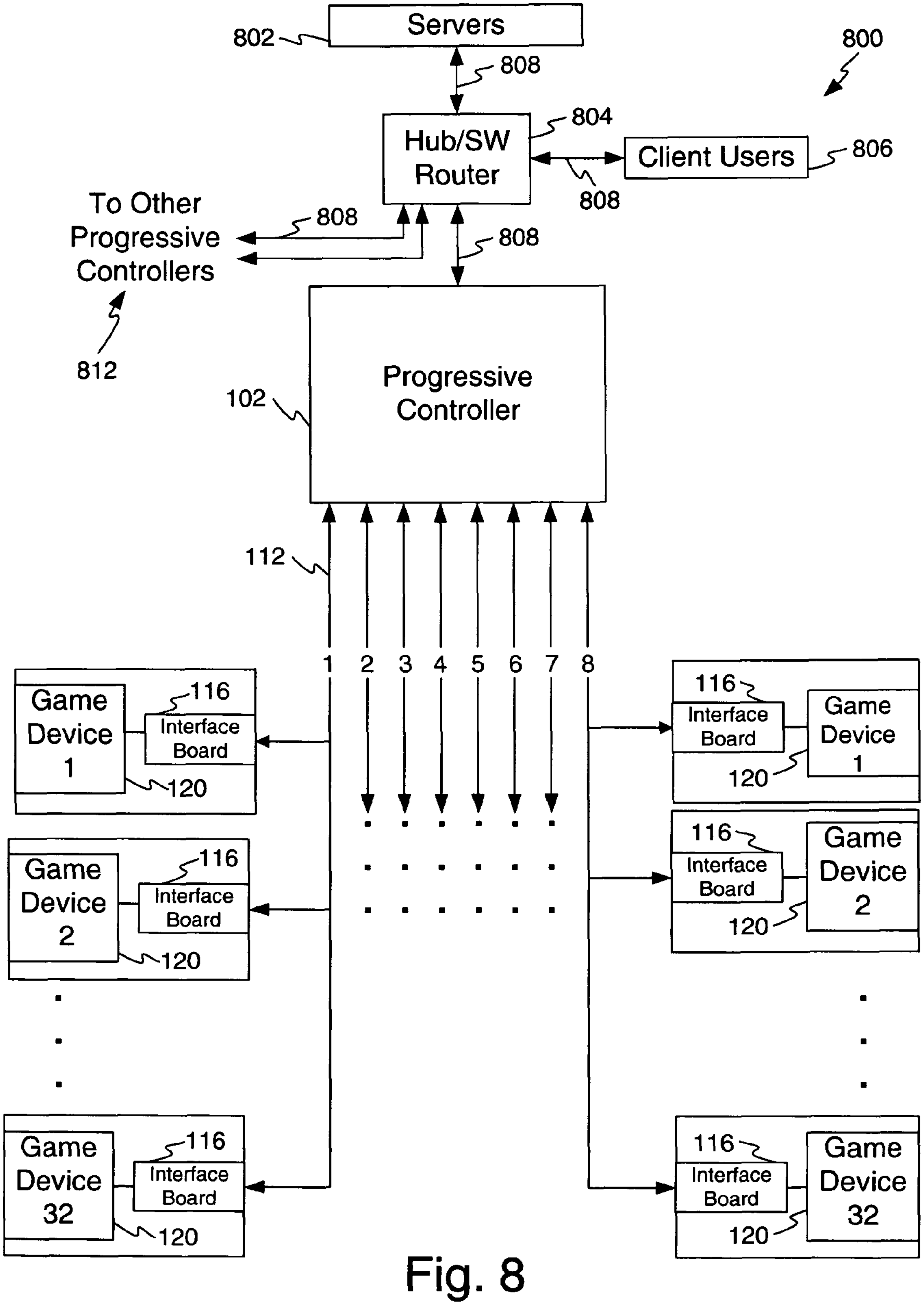
FIG. 8 illustrates an example embodiment of a progressive game network, having multiple progressive controller, and a plurality of gaming devices in communication with a progressive controller.

An alternate embodiment is shown in FIG. 8 which illustrates a progressive game network 800 including similar structure and arrangements as previously described with reference to FIG. 1. Within FIGS. 1 and 8, similar elements and components between have been assigned consistent reference numbers. As seen in FIG. 8, a central server or servers 802 provide a common source for information processing and data storage for a plurality of progressive controllers 102. The server 802 connects to an interconnect 804 by way of a bi-directional communication link 808 and provides communication exchange facility for a plurality of progressive controllers 102 within the progressive game network 800. The interconnect 804 may comprise a hub, a switch, router, or any other element configured to interconnect multiple elements in a network environment.

A client user 806 may then connect to the progressive game network 800 and subsequently to a specific progressive controller 102 by way of another bi-directional communication link 808. It is contemplated that the client user is a connection point for a gaming establishment employee or other user of the network who is responsible for retrieving data from, configuring, and/or operation of the progressive game network 800 and corresponding progressive controller 102. In one embodiment, client user comprises a network terminal, personal computer, laptop, wireless interface, or other element capable of functioning as described herein.

In this example embodiment, the bi-directional communication link 808 is a Ethernet type communication link, networked connection or USB connection, however, other types of secure communication links may be used such as, serial connections, dial-up or wireless connections. In one embodiment the client user 806 may connect to the progressive game network 800, through the interconnect 804, using any type of computing device, such as a desktop computer, laptop computer or hand-held device (e.g., a personal data assistant (PDA)).

Additional progressive controllers 812 may communicate with and be accessed via the network 800. As a result, multiple controllers 102 could be coupled to form a larger network of controllers and a user station 806 may access multiple controllers from a single location.

Figure 9:
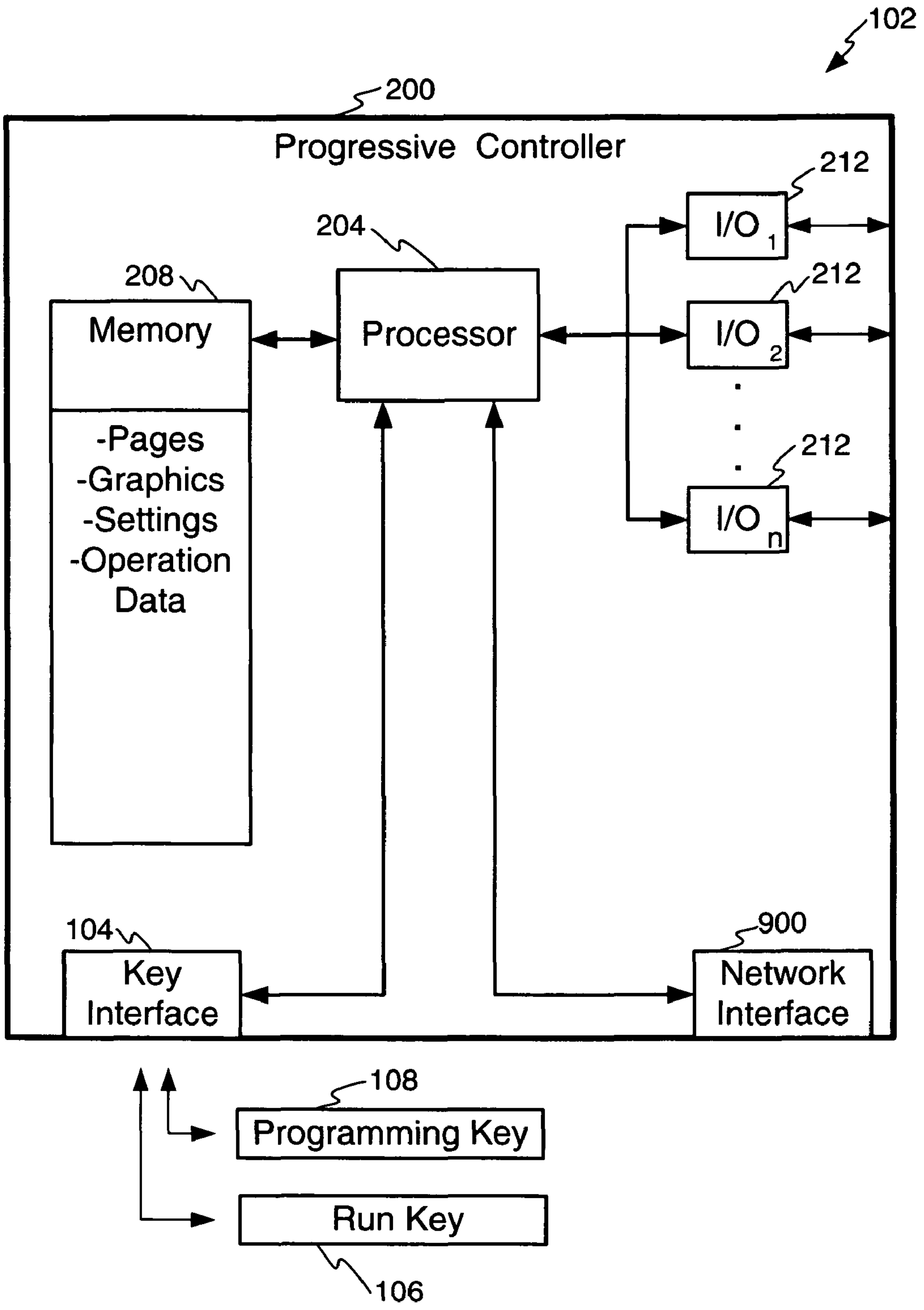
FIG. 9 is a block diagram of an example embodiment of a progressive controller.

FIG. 9 illustrates a block diagram of another example embodiment of the progressive controller 102. Internal to the progressive controller housing 200 is a processor 204 for running various executable codes that facilitate operation of the progressive game network. The executable code is stored within one or more memories 208 and the executable code is accessed by the processor 204 through a bi-directional communication link between the processor 204 and memory 208. The memory 208 may be volatile, non-volatile or a combination of both. Examples of memory 208 include random access memory, optical disk drive technology, magnetic disk drive technology, read only memory, secured digital memory card or other types of computing memory now known or later developed.

The memory 208 is contemplated to comprise memory locations that provide storage for various interface menus or internet/web pages for facilitating the configuration and operation of the progressive controller 102. Some examples of the various menus include basic interface page structure, graphics, controller settings, and controller operational data to name a few. Additionally, the menus include the display and configuration of: progressive group, progressive level, base level for the progressive, group definition, maximum, minimum, increment rate for each progressive. The interface menus, which utilize and access the data in memory, are described in additional detail below.

In this exemplary embodiment, there are several input/output ports 212 associated with and operatively connected to the processor 204. The I/O ports 212 facilitate communication between the progressive controller 102 and the game devices 120. In this example embodiment there is one I/O port 212 for each channel associated with the progressive game network.

Additionally, there is provided a network interface 900 within or operatively coupled with the progressive controller. The network interface 900 provides a means for connection between the progressive controller 102 and the progressive game network. The network interface 900 may be an Ethernet connection, USB port, a wireless communication device or other secure type of data communication link now known or later developed.

The progressive controller 102 may optionally be further configured with a key interface 104. The key interface 104 is structured to operatively accept a single electronic security key (i.e., either a programming key or a run key) and is further structured to facilitate bi-directional communication between the processor 204 or interface 104 and the inserted electronic security key.

It is further contemplated that the memory 208 and processor 204 may be configured to provide for access of the data on the progressive controller such that browser based software located a user terminal, such as a network linked computer, may control and provide access to the client end of the browser application.

It is contemplated that the progressive controller may be configured in a client/server model such that a browser may be enabled on the one or more client users terminals and the user may then browse to the various progressive fields, which may be displayed as pages of browser information. The pages may be created using hyper text mark up language (HTML) or any other format. The HTML files received from the controller instruct the browser how to display text, graphics, controller data, links, on the user display. It is contemplated that the data itself is referenced in the HTML page file, and/or may be stored in the controller. Thus, the controller or a separate location may store the HTML page data, which references the data. Although other languages may be utilized, HTML provides for cross-platform compatibility and reliability. In this way, proprietary software interfaces may be avoided.

To access the controller, a user, as part of the network to which the controller is attached, may type the controller identifier into the browser. The controller identifier may comprise an URL equivalent or a network address of the controller. The network address is sent using HTTP (hypertext transfer protocol), which defines the way the browser and the progressive controller communicate with each other. Other protocols may be utilized. The request to the controller from the browser on the client user terminal may contain protocol identifiers, such as http"// in the URL and may contain a textual or numerical only address. In addition, network location of the controller may also be specified in the address. The request may be broken into HTTP packets which are sent across the network using any accepted communication standard, such as TCP/IP.

In one embodiment, using TCP/IP commands, the browser issues a HTTP request to the progressive controller. The progressive controller receives and processes the HTTP type requests and performs a memory query for the requested data.

The progressive controller interprets the request and separates the actual request from the other packet information. The requested data is retrieved and encoded in an HTTP response packet, which is forwarded using the TCP/IP communication protocol. Upon receipt of the request response, the browser processes the data to create a display page for the received data. Links, such as hyper text links, or buttons may be provided within the page. The display page provides the requesting user with the information retrieved, using the browser, The user may enter data into fields, which may be transmitted to the controller using a process identical to or similar to that described above. The user data or settings are then stored in the controller memory and may alter operation of the progressive controller. This is but one example method and software interface system (browser) for use with system described herein. It is contemplated that in other embodiments, other browsers, interfaces, protocols, and languages may be utilized without departing from the claims that follow.

Figure 10:
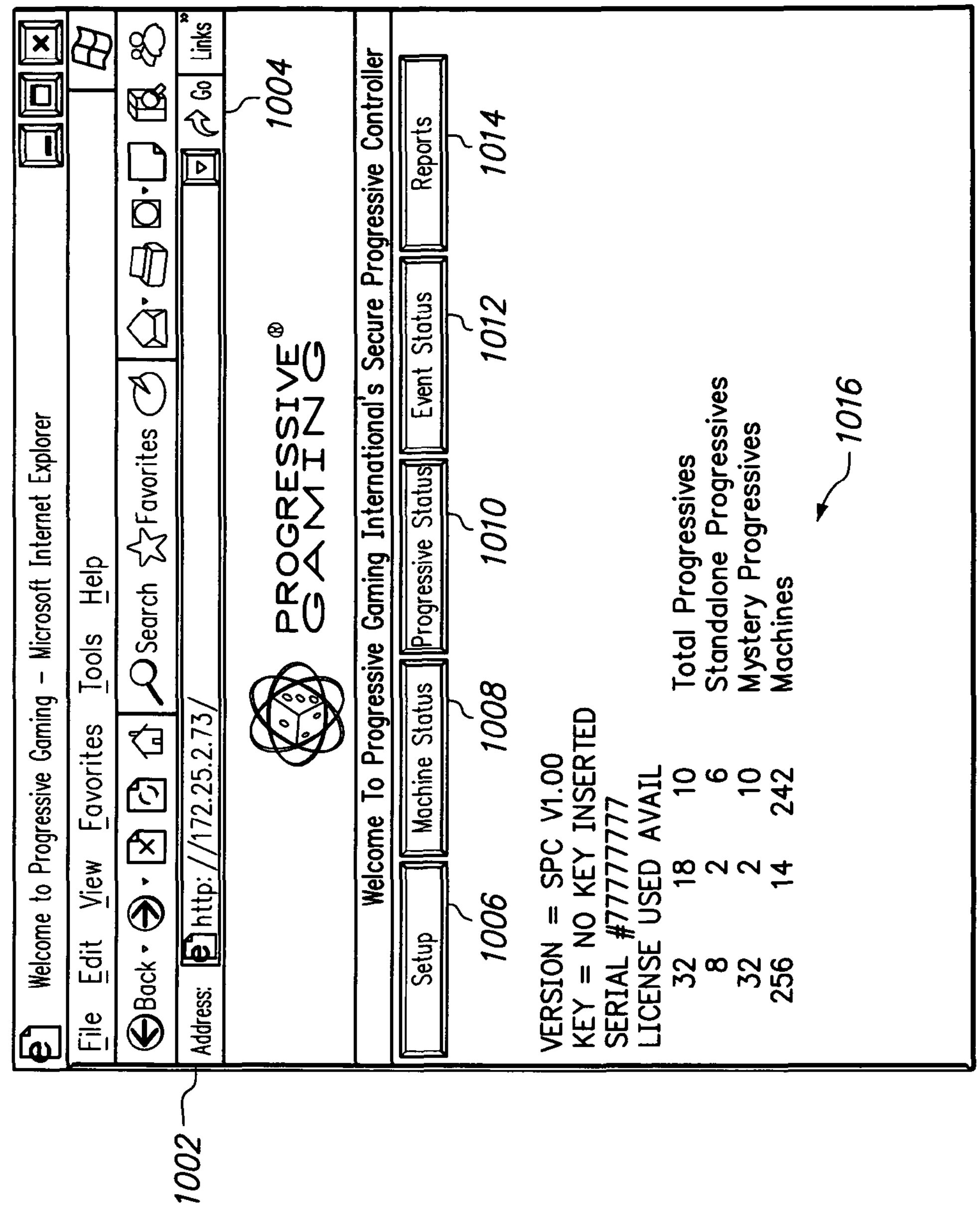
FIG. 10 illustrates a progressive controller internet/web based interface for configuring the progressive controller.
Figure 11:
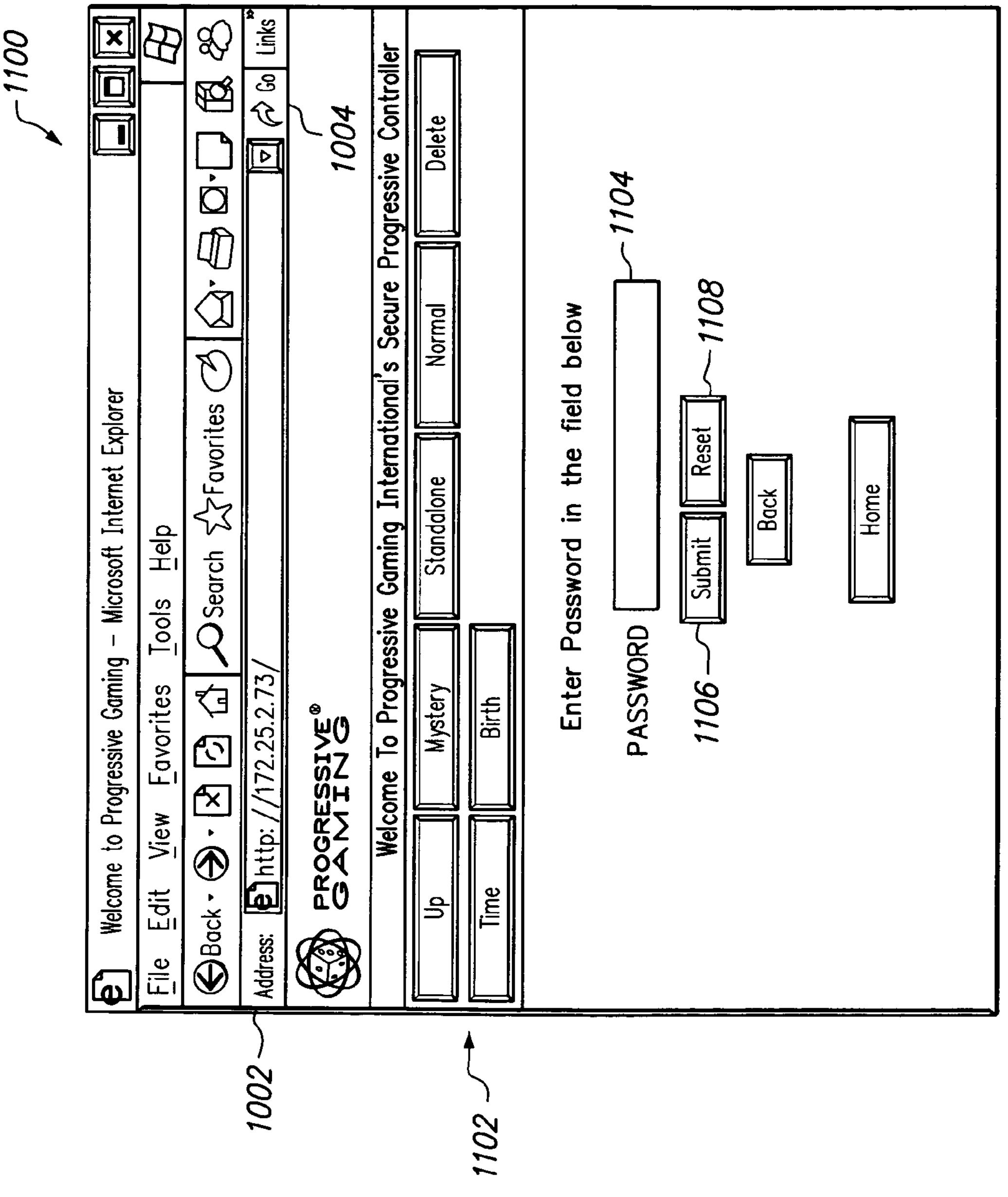
FIG. 11 illustrates an interface for accessing the progressive controller configuration using a secure password.
Figure 12:
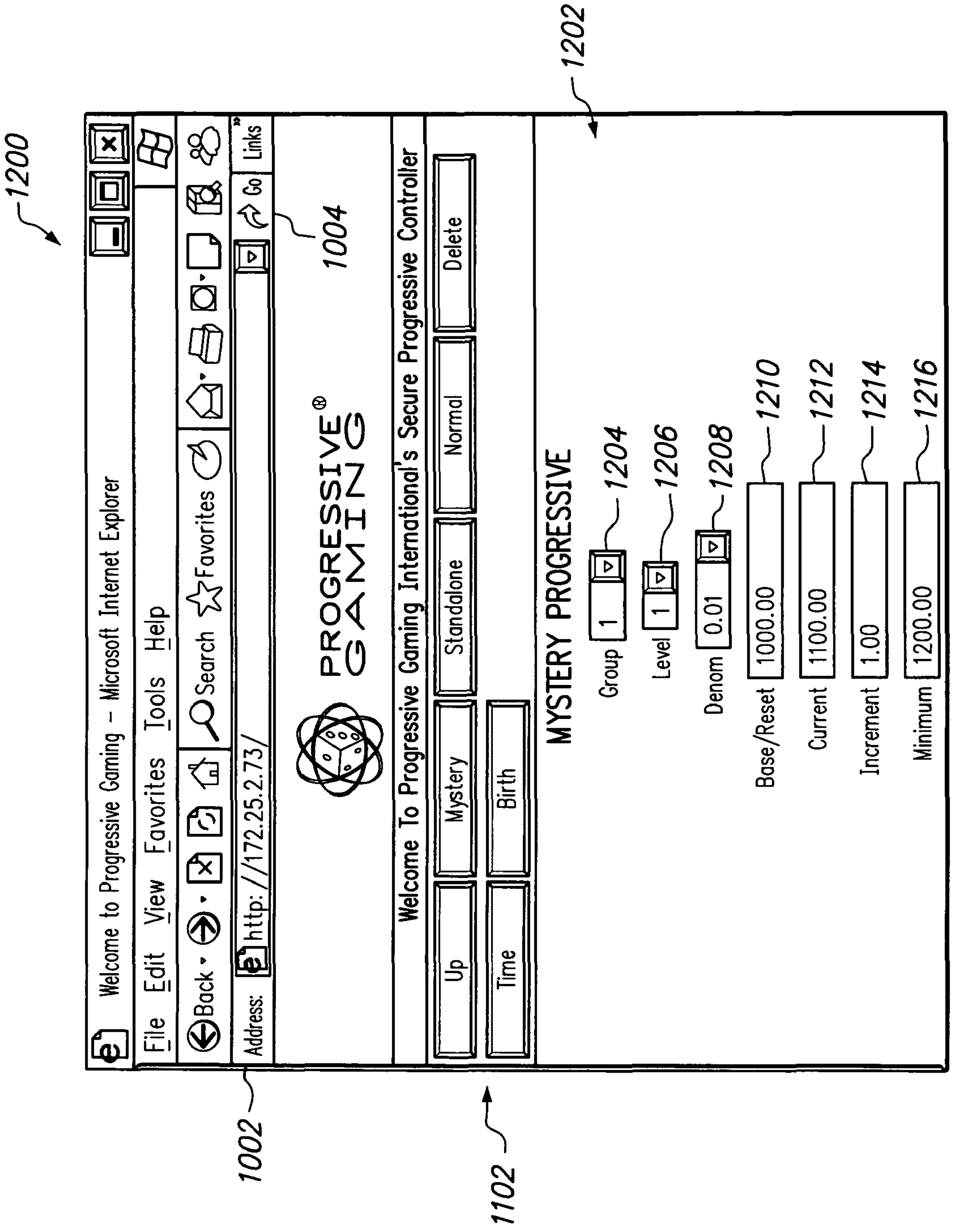
FIG. 12 illustrates an exemplary interface for configuring a mystery progressive.

Reference is now made to FIGS. 10 through 12 which illustrate a series of possible internet/web based interface pages for configuring and operating a progressive controller. In FIG. 10, a main/primary interface page 1000 is illustrated. In this example, the main interface page 1000 is an exemplary browser page configured for use with the present invention. The data used to form this page is stored on the controller and downloaded by a user using the browser protocols described above. Other types of suitable browsers interfaces and software are available and may be implemented in the present invention such as Netscape® and Eudora® to name a few. In operation, the client user accesses a specific progressive controller by inputting a predefined I.P. (in this example "http://172.25.2.73") address into the address field 1002. The client user then activates a command that initiates bi-directional communication with specific progressive controller such as by actuating the "Go" 1004 button on the main interface page 1000. Upon successful connection, data is retrieved from the controller and displayed in the main interface page 1000. The main page 1000 may display a plurality of configuration buttons such as Setup 1006, Machine Status 1008, Progressive Status 1010, Event Status 1012, and Reports 1014.

The Setup 1006 button upon activation launches a subsequent browser window which presents information and additional configuration inputs to the client user for modification or operation of the progressive controller. The Machine Status 1008 button likewise opens browser window that provides information directed towards machine status in an operational matrix which is described in greater detail below with reference to FIG. 15.

The Progressive Status 1010 button, upon activation, provides statusing information and configuration options for the various progressives associated with the progressive controller. The Event Status 1012 button likewise provides statusing information with respect to various progressive controller events. These events may include, but are not limited to: door open/close, power up/down, jackpot hit, errors, events, faults, and modifications to settings. The Reports 1014 button, upon activation, provides the client user with an interface page that permits and facilitates the generation of various informational reports regarding the progressive controller and progressive awards. Some examples of various reports are a handle report representing the total amount wagered on the gaming device, a jackpot report, an event report, a gaming device report and a progressive award report. It is contemplated that many other variations and possible reports are possible and may be custom tailored to provide useful information regarding the progressive game network or controller.

Additionally, the main interface page 1000 may present the client user with a summary area 1016 of progressive controller information. This information may comprise the number of total progressives, standalone progressives, mystery progressives and number of machines. The summary area 1016 may further include an itemization of the number of licensed progressives, number of used progressives and the number of available progressives. It is contemplated that several other types of configuration buttons, machine information, and progressive controller information may be utilized and presented within the scope of the present invention.

FIG. 11 illustrates a logon interface page 1100 which is presented upon activation of the Setup 1006 button of FIG. 10. The logon interface page 1100 has similar functionality as the main interface page 1000 such as the address field 1002 and "Go" button 1004. The logon interface page 1100 provides a plurality of buttons in area 1102 for activating various interface pages directed towards specific aspects of configuring a progressive controller. Additionally, the logon interface page 1100 provides a password entry field 1104 in which the client user may enter a password to access the configuration buttons of area 1102. Upon entry of the password into field 1104, the client user may select a Submit button 1106 or a Reset button 1108 to either authenticate the password or reset the password entry field 1104 respectively. Once the password is authenticated, the client user may activate a configuration button of button area 1102 to access a desired interface page and review and adjust various progressive controller parameters.

FIG. 12 illustrates a mystery interface page 1200, which is presented upon activation of the "Mystery" button of button area 1102. In this example, the mystery interface page 1200 presents various configuration parameters in area 1202 for facilitating configuration and modification of a mystery progressive associated with the specific progressive controller assigned to the present I.P. address (i.e., "http://172.25.2.73"). Some examples of the configuration parameters displayed in area 1202 include: a group selection menu 1204, a level selection menu 1206, a denomination selection menu 1208, a base/reset input field 1210, a progressive current value field 1212, an increment value field 1214 and a minimum value field 1216. It is contemplated that other configuration parameters and display modes may be implemented within the scope of the present invention. Each of the configuration menus or fields are utilized to setup the mystery progressive and one of ordinary skill in the art will appreciate and understand that by modifying the information in the menus or fields, the modified progressive parameters will effect the performance of the mystery progressive. For example, by adjusting the increment value field 1214, the rate at which the progressive increases may be modified to suit the gaming establishment's requirements (i.e., increasing the increment causes the progressive to grow faster and conversely decreasing the increment causes the progressive grow at a slower rate) Adjusting the group value field 1204, determines which gaming devices are assigned to this progressive. Each gaming device is assigned a group. Adjusting the level value field 1206, allows the operator to determine which of the 8 possible jackpot levels allowed per group this Mystery progressive represents. Adjusting the denomination value field 1208, determines which gaming devices specified by denomination may belong to the group specified in the group value field 1204. Adjusting the base/reset value field 1210, sets what amount the progressive controller will assign to the next jackpot after a jackpot hit occurs. Adjusting the current value field 1212, sets the actual value of the jackpot at its installation. The current value field 1212 is a one-time override value that is used on initial configuration of the progressive award or in the case of a "transfer". A transfer is a special case where you are replacing a prior controller with a new controller. In the case of the transfer, the progressive jackpot amount must start at the same level from the outgoing controller. Adjusting the increment value field 1214 sets the percentage of the coin-in added to the jackpot for the denomination amount. Adjusting the minimum value field 1216 sets the minimal amount at which the mystery jackpot can hit.

In one embodiment, the progressive controller has executable code stored within the controller memory that acquires gaming device configuration data and performs an authentication with respect to the progressive controller parameter/setting configurations. This functionality is described in greater detail below with reference to FIGS. 13 and 14.

Figure 13:
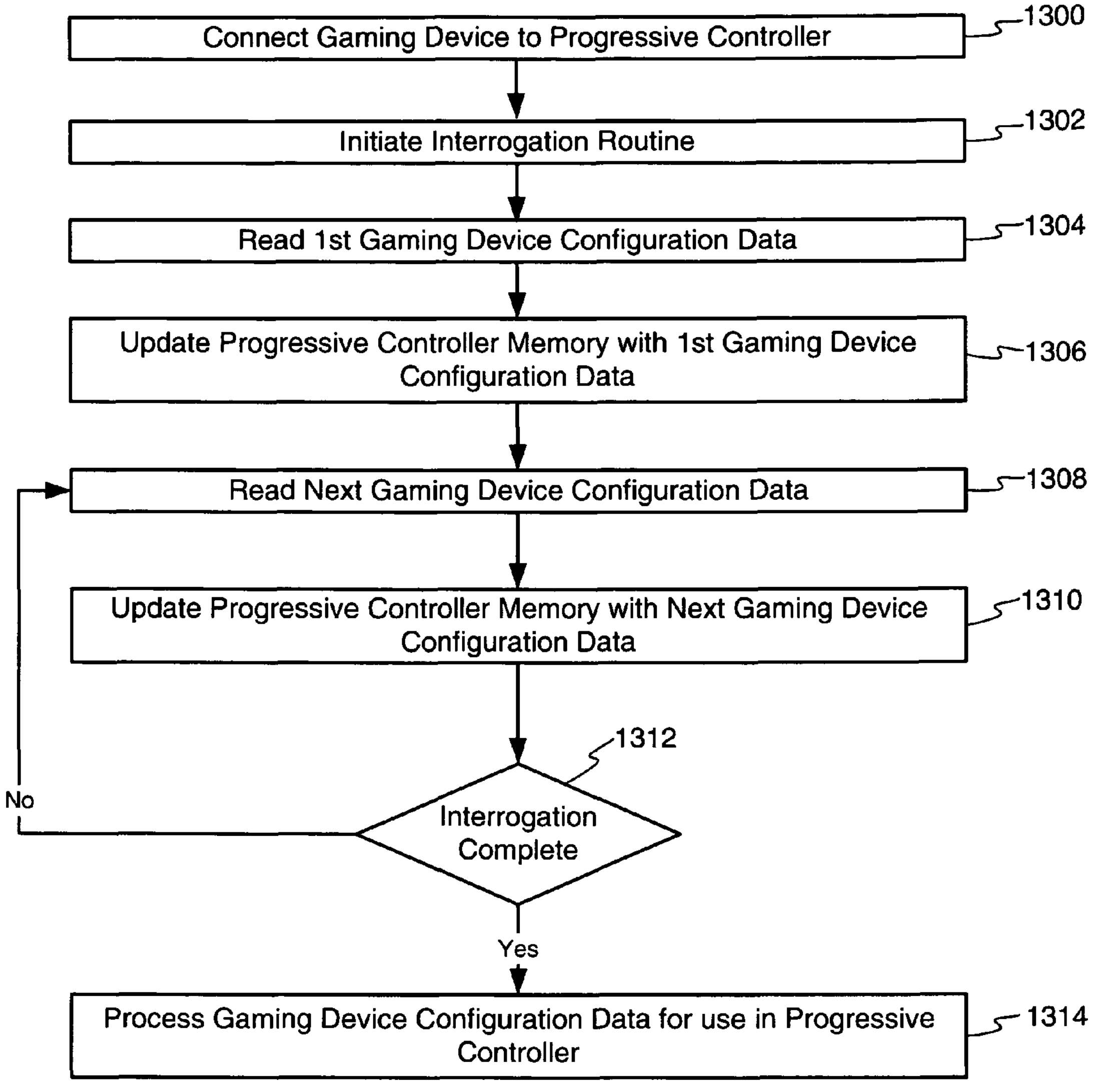
FIG. 13 is an operational flow diagram of one example embodiment for acquiring gaming device configuration data.

FIG. 13 is an operational flow diagram of one exemplary embodiment for acquiring gaming device configuration data. Upon operative connection of a gaming device to the progressive controller at a step 1300 a communication link is established between the gaming device and progressive controller. Each gaming device may be identified on the progressive gaming network by utilizing a network address that is unique to each connected gaming device. The network address for each gaming device may be a TCP/IP address, a URL address or other type of processor based addressing scheme now known or later develop. The addressing scheme may provide a means for secure data transmission between the gaming device and the progressive controller. Upon successful connection of step 1300, the progressive controller's executable code initiates an interrogation routine at a step 1302. The interrogation routine polls each gaming device connected to the progressive controller to acquire data or information pertaining to the gaming device's configuration. This gaming device configuration data or information may include but is not limited to: denomination, percent hold, percent payout, progressive group numbers, progressive level numbers, progressive game network address, original pay table payout, hit frequency.

Next, at a step 1304, the progressive controller reads or acquires a first portion or element of gaming device configuration data such as the device's denomination. This first portion of gaming device configuration data is then subsequently stored within the progressive controller memory at a step 1306. The interrogation routine then continues to poll the gaming device to obtain each configuration data element. This occurs at a step 1308 until all of the data elements have been acquired. Subsequently, at a step 1310 the acquired gaming device configuration data elements are stored within the progressive controller's memory. The interrogation routine continues until at a decision step 1312 it is determined by the routine that all of the gaming device configuration data elements have been acquired from the gaming machine. Upon completion of the interrogation routine, the acquired gaming device configuration data is processed for use and authentication/validation by the progressive controller at a step 1314. This process continues for each gaming machine connected to the progressive controller. In the event of a single gaming machine is connected to an operational progressive controller, the controller would automatically interrogate the newly connected gaming machine.

Figure 14:
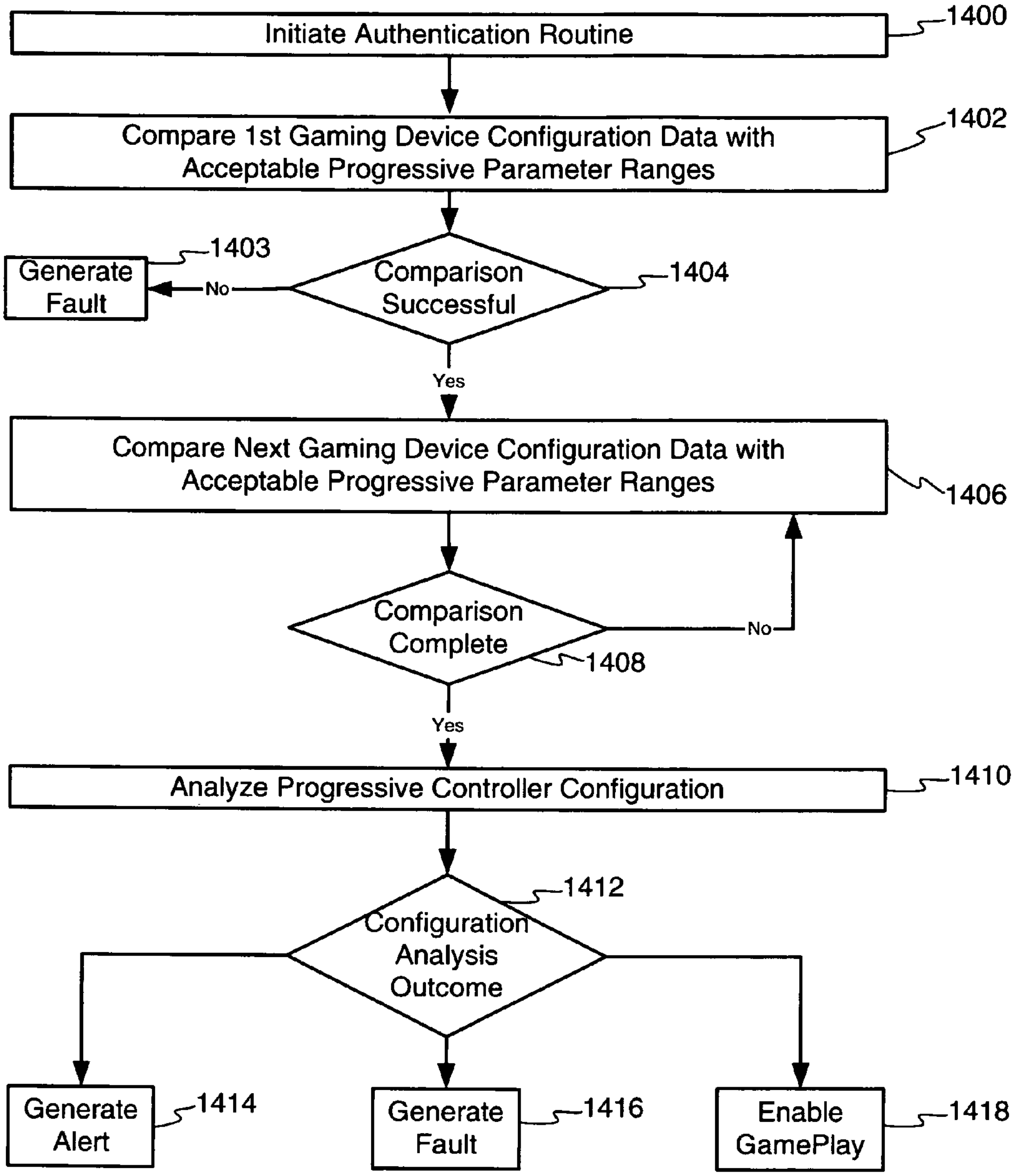
FIG. 14 is an operational flow diagram of one example embodiment for authentication of gaming device configuration data.

FIG. 14 is an operational flow diagram of one exemplary method for authentication/validation of gaming device configuration data. After completion of the steps previously described and illustrated in FIG. 13, the progressive controller initiates an authentication/validation routine at a step 1400 of FIG. 14. The authentication routine compares, validates and analyzes the gaming device configuration data with respect to acceptable progressive controller parameter ranges. At a step 1402, the authentication routine compares a first gaming device configuration data element with a valid value or range of values that are accepted by the progressive parameters. For example the comparison may validate that the gaming device denomination value as interrogated from the machine corresponds to a valid and accepted denomination value that will be recognized by the progressive controller. It is contemplated that the validation be performed upon one or more gaming device configuration data elements and the corresponding allowed progressive parameters, or parameter range. Examples of other validations include: comparing progressive group/level assignments, percentage of wagers that are assigned to the progressive award, and percentage of the gaming device wager retention or hold. Next, at a step 1404, the authentication routine determines if the comparison is successful, and if not, a system fault is generated at a step 1403. If the comparison is successful, the authentication routine proceeds to a step 1406.

At step 1406, the authentication routine compares a subsequent gaming device configuration data element with respect to a corresponding range of progressive parameters. The authentication routine continues until at a decision step 1408 it is determined by the routine that all of the gaming device configuration data elements have been compared to acceptable progressive parameter ranges.

Upon completion of step 1408, the progressive controller configuration is analyzed at a step 1410. The analysis that occurs at step 1410 is to determine if the progressive controller is configured in a manner that insures proper operation of the progressive controller and maintains acceptable levels of monetary return to the casino. For example, it is highly undesirable for the progressive controller to be configured in such a way that returns more money to the player than is collected by the casino. Various acceptable rate-of-return ranges may be established by the casino or progressive controller manufacture and during this comparison processes, overall payout rates determined by the casino or controller manufacturer will be compared to these actually established within the progressive controller. This provides the benefit of providing an automated analysis to determine if the progressive controller is configured to payout at an undesirably large payout rate.

In one embodiment there are three potential configuration analysis outcomes as illustrated at a step 1412 of FIG. 14. A first outcome may be to generate an alert at a step 1414. The alert is a notification to the gaming establishment that a gaming device or progressive controller is operating within a performance range that requires additional monitoring by the gaming establishment. In one embodiment the performance range is the hold percentage of the machine, the progressive controller, or both. This provides the gaming establishment with notice that a gaming device may be performing in a reduced profitability range. It is contemplated that although an alert is issued, game play may still be permitted at the gaming device while at the same time notifying the gaming establishment that the gaming device may deviate from an acceptable performance range.

For example, an authenticated progressive parameter may have a payout range or wager return of 100% to 105% and the analysis would generate a warning or alert displayed to the gaming establishment that this gaming device is operating within a less than optimal performance range. It is also contemplated that jurisdictional requirements of minimum or maximum payback percentages may generate an alert.

A second configuration analysis outcome generates a fault at a step 1416. When a fault is generated the gaming device is dropped or disassociated with the progressive game network and is no longer available for progressive game play. In another embodiment, the fault may cause the gaming device to become inoperable until the fault is resolved by gaming establishment personnel. A fault is used to disable the gaming device that is operating outside an acceptable progressive parameter range. For example, an authenticated progressive parameter may have an analyzed payout range of greater than 105% and the analysis thereby generates a fault to prevent play of that specific gaming device or progressive controller.

Additionally, faults may be generated by, but not limited to one or more of the following conditions: denomination is incorrect, address conflicts, progressive amount not paid correctly, invalid coin-in (too large or too small), jackpot reported on the wrong group, jackpot reported on the wrong level.

In one embodiment, the final configuration analysis outcome at a step 1418 is to enable game play. The enablement of game play at step 1418 comprises an analysis result where the gaming device configuration data elements and the settings of the progressive controller are within the acceptable progressive parameter ranges and there is no requirement for generating either an alert or fault.

Figure 15:
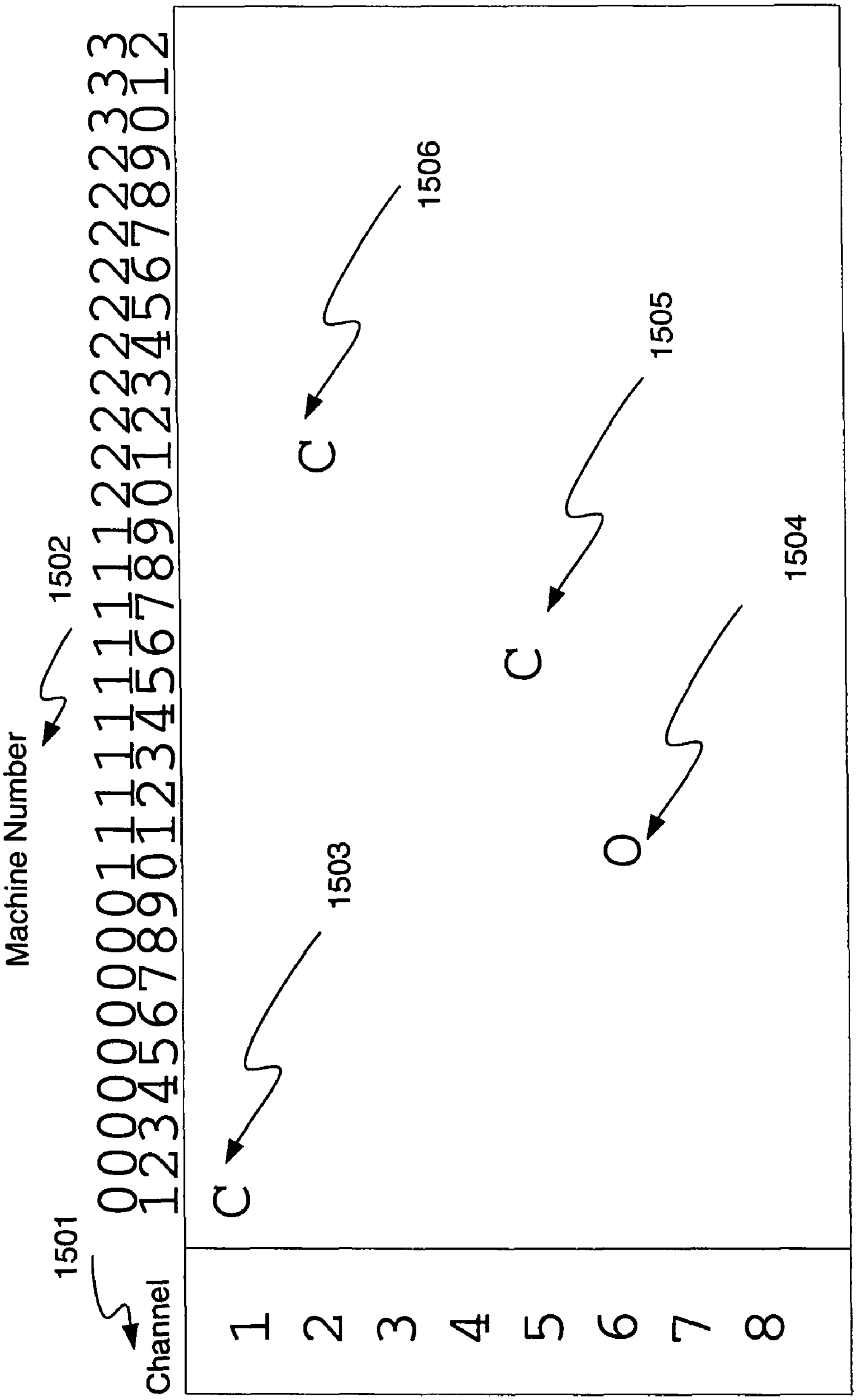
FIG. 15 is a block diagram illustrating gaming device or machine status operational matrix.

In one embodiment, the gaming device or gaming machine status operational matrix is a defined as a chart plotting the progressive controller channel 1501 on the y axis, and the gaming device machine number 1502 on the x axis as illustrated in FIG. 15. Each combination of channel and machine number forms a status cell. If there is a machine in the status cell corresponding to a particular machine number, a status character is placed. A status character may be one of, but not limited to: "-", "O", "C", "J". Where "-" designates that a machine is not online. Where "O" designates that a machine is online. Where "C" designates that a machine is online and has coin in. Where "J" designates a machine in jackpot. In the embodiment shown, machine 1 1503 is on channel 1 and has a coin in status. Machine 10 1504 is on channel 6 and is offline as designated by "O". Machine 15 1505 is on channel 5 and has a coin in status. Machine 21 1506 is on channel 2 and also has a coin in status. It is further contemplated that the operational status matrix of FIG. 15 may be implemented using a web based browser or may be created using hyper text mark up language (HTML) or any other format.

As will now be apparent, progressive systems configured according to the teachings of the invention provide a number of advantages over known systems which do not have secure configuration and authentication as described herein.

Incorporating the use of a progressive controller access interface that does not require proprietary software increases the ease of use for the gaming establishment by providing a standardized and commonly available software interface. This benefit is realized because web browser interface is used to access the progressive controller configuration parameters from a remote computer, such as via a network. The traditional way in which progressive systems were configured required the use of proprietary software on the computer connecting to the progressive controller. As a result, all of the computers that were utilized to connect to the progressive controller had to have the same version of the proprietary software. This resulted in the gaming establishment having to expend resources to ensure that all of the proprietary software versions were the same and up-to-date. If the versions were inconsistent the progressive controller configurations could be substantially compromised. By enabling access to the progressive system configuration settings using a web browser interface, the progressive system is easily accessed by the gaming establishment's personnel from common network terminals. Consequently, the gaming establishment enjoys increased flexibility and ease of use in operating the progressive controller.

Another benefit realized by the method and apparatus disclosed herein is a highly accurate and secure configuration/authentication process of the progressive controller and resulting progressive controller. Existing progressive systems required the gaming establishment to manually record the configuration settings of each gaming device connected to the progressive controller and then manually input the recorded configuration settings into the progressive controller. One major detriment of the existing systems was a propensity for human error regarding the manual recording and data input of the gaming device configuration settings into the controller. As a result, the configuration settings that were entered in error could cause excessive or erroneous progressive awards to be paid out or the entire progressive system to be non-operational.

Another major detriment of the existing progressive systems was that the recording and data input for each gaming device connected to the progressive game network is expensive and labor intensive. The present invention provides accurate and automated progressive system configuration and authentication. In this way, the gaming establishment has increased confidence and assurance in the configuration and operation of the progressive system. Additionally, the configuration and authentication is performed automatically and with a reduce propensity for data errors and is cost efficient.

While various embodiments of the invention have been described, it will be apparent to those of ordinary skill in the art that many more embodiments and implementations are possible that are within the scope of this invention. In addition, the various features, elements, and embodiments described herein may be claimed or combined alone in any combination or arrangement.

What is claimed is:

1. A system for configuring and authenticating a progressive game network, the system comprising:

a plurality of gaming devices, the plurality of gaming devices being associated with a predetermined number of licensed gaming devices;

a progressive controller coupled to the plurality of gaming devices, the progressive controller comprising:

memory configured with machine readable code stored thereon;

a processor coupled to the memory, wherein the processor is configured to read and execute the machine readable code, the machine readable code configured to:

control access from a secondary computer to the progressive controller using a logon routine; and in response to a successful logon, present a plurality of interface pages using an HTML capable browser, wherein the interface pages permit modification of a plurality of progressive controller configuration settings; and a key interface integrated within the progressive controller and configured to use a programming key to enable modifications to a plurality of progressive controller configuration settings and a run key to enable operation of the predetermined number of licensed gaming devices of the plurality of gaming devices coupled with the progressive game network, wherein the key interface is configured to receive only one of the programming key and the run key at a time.

2. The system of claim 1 wherein the interface pages are configured to modify the progressive controller configuration settings.

3. The system of claim 1 wherein the programming key is configured to authorize logon.

4. The system of claim 3 wherein the programming key is specifically associated to the progressive controller.

5. The system of claim 1 wherein modification of the progressive controller configuration settings comprise modifications selected from the group consisting of a group level, a denomination a base/reset, a current value, an increment percentage, a minimum value and a maximum value.

6. The system of claim 1 wherein the key interface is configured to differentiate the programming key from the run key using a data bit modification.

7. The system of claim 1 wherein the key interface is configured to use the programming key to disable operation of the predetermined number of licensed gaming devices.

8. A system for configuring a progressive game network, the system comprising:

a plurality of gaming devices, the plurality of gaming devices being associated with a predetermined number of licensed gaming devices;

a progressive controller coupled to the plurality of gaming devices, the progressive controller comprising:

a processor coupled to a memory, the memory having a machine readable code stored thereon, the machine readable code configured with an interrogation routine which polls a plurality of gaming devices connected to the progressive controller to acquire progressive setup information from the gaming devices; and a key interface coupled to the processor and the memory within the progressive controller and configured to use a programming key to enable modifications to a plurality of progressive parameter configurations and a run key to enable operation of the predetermined number of licensed gaming devices of the plurality of gaming devices coupled with the progressive game network, wherein the key interface is configured to receive only one of the programming key and the run key at a time.

9. The system of claim 8 further comprising an authentication routine, wherein the authentication routine compares a plurality of gaming device configuration data with a plurality of predetermined progressive parameter ranges and analyzes a progressive controller configuration to enable game play, generate an alert or generate a fault.

10. The system of claim 8 wherein the interrogation routine utilizes a network address unique to each of the plurality of gaming devices.

11. The system of claim 8 wherein the progressive setup information obtained from each of the plurality of gaming devices is selected from the group consisting of percentage, denomination, progressive group, network address and hit frequency.

12. The system of claim 8 wherein each of the plurality of gaming devices is selected from the group of gaming devices consisting of table games, slot machines, poker machines, keno machines and lottery machines.

13. The system of claim 8 wherein the programming key and run key are specifically associated to the progressive controller.

14. The system of claim 8 wherein the number of licensed gaming devices of the plurality of licensed gaming devices enabled by the progressive controller resides on the programming key.

15. A method of configuring a progressive system, the method comprising:

connecting at least one gaming device to a progressive controller that includes a processor, a memory, and a key interface;

reading progressive parameter ranges from a programming key via the key interface;

initiating an interrogation routine, wherein the interrogation routine reads one or more gaming devices to obtain gaming device configuration data related to the progressive parameter ranges and stores the gaming device configuration data in a memory;

initiating an authentication routine which analyzes a progressive controller configuration to determine if the progressive controller is configured properly and which compares the gaming device configuration data with corresponding predetermined progressive parameter ranges in order to determine if the gaming device configuration data is within the progressive parameter ranges;

in response to a determination that the gaming device configuration data is within the progressive parameter ranges, enabling game play of a predetermined number of gaming devices upon replacement of the programming key with a run key that includes the predetermined number of gaming devices stored thereon; and in response to a determination that the gaming device configuration data is outside of the progressive parameter ranges, generating a fault.

16. The method of claim 15 wherein the authentication routine performs comparisons to determine if the progressive controller is configured to payout at an undesirable payout rate, the comparisons selected from the group consisting of progressive group level assignments, percentage of wagers that are assigned to the progressive award, and percentage of the gaming device wager retention.

17. The method of claim 15 wherein the key interface utilizes the programming key to enable modifications to the progressive parameter configurations.

18. The method of claim 17 wherein the programming key is specifically associated to the progressive controller.

19. The method of claim 15 wherein the gaming device configuration data obtained from each of the plurality of gaming devices comprises denomination, percent hold, percent payout, progressive group numbers, progressive level numbers, and progressive game network address.

20. A system for reporting and statusing of one or more progressive game networks, the system comprising:

a plurality of gaming devices, the plurality of gaming devices being associated with a predetermined number of licensed gaming devices; and at least one progressive controller comprising:

a processor having input and output ports to facilitate communication with the plurality of gaming devices and the processor coupled to a memory, the memory having machine readable code stored thereon, the machine readable code configured to:

permit access from a secondary computer to a plurality of progressive controller configuration settings upon a successful logon; and present a plurality of interface pages using an HTML capable browser, wherein the interface pages present status information regarding the progressive game network; and a key interface configured to receive a programming key, and to read the plurality of progressive controller configuration settings from the programming key, the key interface further configured to enable insertion of a run key in place of the programming key and to retrieve the predetermined number of licensed gaming devices of the plurality of gaming devices from the run key.

21. The system of claim 20 wherein the status is presented in an HTML operational status matrix.

22. The system of claim 20 wherein the status comprises gaming device, progressive award, and event information.

23. The system of claim 20 wherein a plurality of reports are generated for a handle, a jackpot, an event, a gaming device status and a progressive award status.

24. The system of claim 20 wherein the reporting and statusing for the at least one progressive controller and one or more progressive game networks comprises a single set of interface pages.

25. A system for configuring and authenticating a progressive game network, the system comprising:

a plurality of gaming devices, the plurality of gaming devices being associated with a predetermined number of licensed gaming devices;

a progressive controller comprising:

a key interface configured to receive a programming key and to retrieve a plurality of progressive parameter ranges from the programming key, the key interface further configured to enable insertion of a run key in place of the programming key and to retrieve the predetermined number of licensed gaming devices from the run key;

a processor coupled to a memory and the key interface, the memory having machine readable code stored thereon, the machine readable code configured with:

an interrogation routine that reads a plurality of gaming device configuration data from the gaming device and stores the gaming device configuration data within the memory;

an authentication routine that compares a plurality of gaming device configuration data with the plurality of progressive parameter ranges and analyzes a progressive controller configuration to determine if the progressive controller is configured properly to enable game play, generate an alert or generate a fault; and a comparison routine that, in response to a determination that the gaming device configuration data is within the progressive parameter ranges, enables game play of a predetermined number of the plurality of gaming devices upon replacement of the programming key with a run key that includes the predetermined licensed number of the plurality of gaming devices stored thereon.

26. The system of claim 25 wherein the interrogation routine utilizes a network address unique to each of the plurality of gaming devices.

27. The system of claim 25 wherein the progressive setup information obtained from each of the plurality of gaming devices selected from the group consisting of percentage, denomination, progressive group, network address and hit frequency.

28. The system of claim 25 wherein the key interface utilizes the programming key to enable modifications to the plurality of progressive parameters and the run key to enable operation of the predetermined number of licensed gaming devices coupled with the progressive game network.

29. The system of claim 28 wherein the programming key and run key are specifically associated to the progressive controller.

* * * * *